(12) United States Patent
Ichihashi et al.

(10) Patent No.: US 10,649,325 B2
(45) Date of Patent: May 12, 2020

(54) MEMBER FOR DISPLAYING PROJECTED IMAGE AND PROJECTED IMAGE DISPLAY SYSTEM

(71) Applicant: FUJIFILM Corporation, Tokyo (JP)

(72) Inventors: Mitsuyoshi Ichihashi, Ashigarakami-gun (JP); Akihiro Anzai, Ashigarakami-gun (JP); Shunya Katoh, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 158 days.

(21) Appl. No.: 15/466,331

(22) Filed: Mar. 22, 2017

(65) Prior Publication Data
US 2017/0192231 A1 Jul. 6, 2017

Related U.S. Application Data

(63) Continuation of application No. PCT/JP2015/077231, filed on Sep. 28, 2015.

(30) Foreign Application Priority Data

Sep. 29, 2014 (JP) .................................. 2014-199277
Aug. 17, 2015 (JP) .................................. 2015-160626

(51) Int. Cl.
*G02B 27/01* (2006.01)
*G02F 1/13363* (2006.01)
(Continued)

(52) U.S. Cl.
CPC ............ *G03B 21/604* (2013.01); *B60K 35/00* (2013.01); *G02B 5/3083* (2013.01);
(Continued)

(58) Field of Classification Search
CPC ............................. G02F 1/1339; G02F 1/1333
See application file for complete search history.

(56) References Cited

U.S. PATENT DOCUMENTS 5,013,134 A    5/1991  Smith
5,193,015 A *  3/1993  Shanks ................ G02B 5/3016
                                         348/E9.025
(Continued)

FOREIGN PATENT DOCUMENTS

CN    101114075 A    1/2008
EP    0 296 710 A2   12/1988
(Continued)

OTHER PUBLICATIONS

International Preliminary Report on Patentability and Translation of Written Opinion, dated Apr. 13, 2017, from the International Bureau in counterpart International Application No. PCT/JP2015/077231.
(Continued)

*Primary Examiner* — Phu Vu
(74) *Attorney, Agent, or Firm* — Sughrue Mion, PLLC

(57) ABSTRACT

The present invention provides a member for displaying a projected image and a projected image display system in which a clear image can be displayed with high reflectivity and high transmittance without a double image, the member for displaying a projected image including a reflection layer, and a λ/2 phase difference layer, in which the reflection layer includes a cholesteric liquid crystal layer having selective reflection in a visible light range, and the projected image display system including the member for displaying a projected image, in which the λ/2 phase difference layer is disposed on an incidence ray side with respect to the reflection layer, and the incidence ray is p-polarized light which vibrates in a direction parallel to an incidence surface.

20 Claims, 1 Drawing Sheet

(51) Int. Cl.

| | |
|---|---|
| *G02F 1/1347* | (2006.01) |
| *G03B 21/604* | (2014.01) |
| *B60K 35/00* | (2006.01) |
| *G03B 21/62* | (2014.01) |
| *H04N 9/31* | (2006.01) |
| *G02B 5/30* | (2006.01) |
| *G02B 5/26* | (2006.01) |

(52) U.S. Cl.
CPC ......... *G02B 27/0101* (2013.01); *G03B 21/62* (2013.01); *H04N 9/3167* (2013.01); *B60K 2370/1529* (2019.05); *B60K 2370/25* (2019.05); *B60K 2370/334* (2019.05); *B60K 2370/39* (2019.05); *B60K 2370/66* (2019.05); *B60K 2370/785* (2019.05); *G02B 5/26* (2013.01); *G02B 5/3016* (2013.01); *G02B 2027/012* (2013.01); *G02B 2027/0194* (2013.01); *G02F 2001/13478* (2013.01); *G02F 2001/133638* (2013.01)

(56) References Cited

U.S. PATENT DOCUMENTS

| | | | |
|---|---|---|---|
| 5,510,913 | A | 4/1996 | Hashimoto et al. |
| 2004/0135742 | A1 | 7/2004 | Weber et al. |
| 2008/0024700 | A1 | 1/2008 | Yoshimi |
| 2009/0237789 | A1 | 9/2009 | Ono et al. |

FOREIGN PATENT DOCUMENTS

| | | | |
|---|---|---|---|
| JP | 03-150546 | A | 6/1991 |
| JP | 2564366 | B2 | 12/1996 |
| JP | 09-325293 | A | 12/1997 |
| JP | 11-249062 | A | 9/1999 |
| JP | 2003-307622 | A | 10/2003 |
| JP | 2005-292423 | A | 10/2005 |
| JP | 2006-512622 | A | 4/2006 |
| JP | 2015-116369 | A | 6/2015 |

OTHER PUBLICATIONS

Extended European Search Report dated Aug. 21, 2017 from the European Patent Office in counterpart European Application No. 15847700.0.
Office Action dated Oct. 2, 2018 from the Japanese Patent Office in counterpart Japanese Application No. 2016-551994.
Office Action dated Feb. 20, 2018 from the Japanese Patent Office in counterpart Japanese application No. 2016-551994.
International Search Report for PCT/JP2015/077231 dated Dec. 15, 2015.
Written Opinion for PCT/JP2015/077231 dated Dec. 15, 2015.
Communication dated Aug. 14, 2018, issued by the State Intellectual Property Office of People's Republic of China in counterpart application No. 201580052425.X.
Office Action dated Apr. 10, 2019 issued by the State Intellectual Property Office of People's Republic of China in counterpart Chinese application No. 201580052425.X.
Communication dated Mar. 25, 2020, issued by the European Patent Office in European application No. 15 847 700.0.

\* cited by examiner

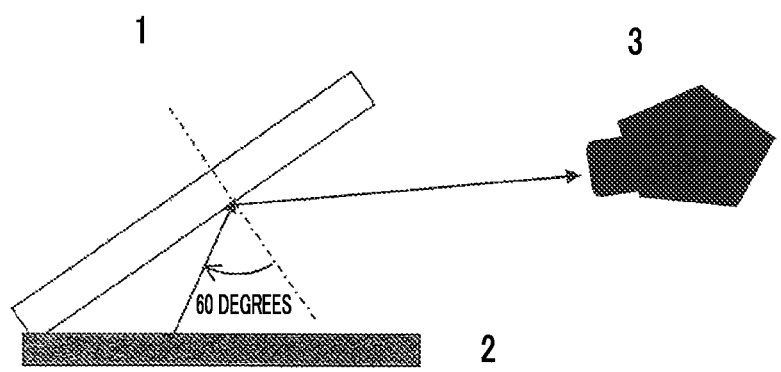

MEMBER FOR DISPLAYING PROJECTED IMAGE AND PROJECTED IMAGE DISPLAY SYSTEM

CROSS-REFERENCE TO RELATED APPLICATIONS

This application is a continuation of PCT International Application No. PCT/JP2015/077231 filed on Sep. 28, 2015, which claims priorities under 35 U.S.C § 119 (a) to Japanese Patent Applications Nos. 2014-199277 and 2015-160626 filed on Sep. 29, 2014 and Aug. 17, 2015, respectively, the entire contents of which are incorporated herein by reference.

BACKGROUND OF THE INVENTION

1. Field of the Invention

The present invention relates to a member for displaying a projected image. More specifically, the present invention relates to a member for displaying a projected image which can be used as a combiner in a head up display system. In addition, the present invention relates to a projected image display system using the member for displaying a projected image described above.

2. Description of the Related Art

In a projected image display system, a video projected by a projector is displayed by a member for displaying a projected image. For example, in a head up display system which is one of projected image display systems, a member for displaying a projected image having a function as a combiner which can simultaneously display a video to be projected and front scenery is used. In a head up display system where wind shield glass is used as such a member for displaying a projected image, a double image due to reflection of projection light on a front surface or a rear surface of glass easily becomes considerable, and thus, various solving methods have been attempted from the related art.

For example, in U.S. Pat. No. 5,013,134A, a method is proposed in which a cross-sectional surface of an intermediate film of wind shield glass which is laminated glass is in the shape of a wedge, a reflection image from a glass plate on the outside of a car is allowed to be coincident with a reflection image from a glass plate on the inside of the car. Various technologies have been known in which a BREWSTER angle is used by allowing p-polarized light to be incident on a glass surface, and reflection light from a front surface of a member for displaying a projected image becomes close to zero, and thus, a double image is solved (for example, JP2006-512622A).

SUMMARY OF THE INVENTION

In the technology described in U.S. Pat. No. 5,013,134A, an advanced technology is required for adjusting an angle between the glass plate on the outside and the glass plate on the inside. In addition, even in the method using the BREWSTER angle as described in JP2006-512622A, simultaneously ensuring sufficient light reflectivity and sufficient light transmittance along with solving the double image still remain as a problem.

An object of the present invention is to provide a member for displaying a projected image from which a head up display system can be provided without a double image, and in which reflectivity of projection light is high, and transmittance of visible light is high. In addition, another object of the present invention is to provide a projected image display system such as a head up display system or the like which can display a clear image with high reflectivity and high transmittance without a double image.

In order to attain the objects described above, the present inventors have focused on using a cholesteric liquid crystal layer in a reflection layer. That is, the present inventors have attempted that p-polarized light is used as an incidence ray, a double image is prevented by suppressing reflection light from a front surface of a member for displaying a projected image, and then, a projected image can be obtained by using selective reflection of a cholesteric liquid crystal layer. At this time, it is predicted that the cholesteric liquid crystal layer reflects circularly polarized light, and thus, a $\lambda/4$ phase difference layer changing linearly p-polarized light to circularly polarized light is further used, and a clear projected image can be obtained. However, in practice, a cholesteric liquid crystal layer and a $\lambda/4$ phase difference layer are used by being combined, but only a projected image in the amount of light lower than the amount of light which is theoretically predicted is obtained. Then, in this circumstance, even in a case where an azimuth of a slow axis is changed with respect to incidence p-polarized light, a great improvement is not observed. For this reason, the present inventors have conducted intensive studies about a configuration of a member for displaying a projected image using a cholesteric liquid crystal layer as a reflection layer, and thus, have completed the present invention.

That is, the present invention provides [1] to [14] described below.

[1] A member for displaying a projected image, comprising: a reflection layer; and a $\lambda/2$ phase difference layer, in which the reflection layer includes a cholesteric liquid crystal layer having selective reflection in a visible light range.

[2] The member for displaying a projected image according to [1], in which a front phase difference of the $\lambda/2$ phase difference layer is in a range of 190 nm to 390 nm.

[3] The member for displaying a projected image according to [1] or [2], in which the reflection layer includes three or more cholesteric liquid crystal layers having selective reflection in a visible light range, and the three or more cholesteric liquid crystal layers have center wavelengths of the selective reflection which are different from each other.

[4] The member for displaying a projected image according to [3], in which a cholesteric liquid crystal layer having a center wavelength of selective reflection in 490 nm to 570 nm, a cholesteric liquid crystal layer having a center wavelength of selective reflection in 580 nm to 680 nm, and a cholesteric liquid crystal layer having a center wavelength of selective reflection in 700 nm to 830 nm are provided.

[5] The member for displaying a projected image according to [3] or [4], in which spiral senses of all of the cholesteric liquid crystal layers are identical to each other.

[6] The member for displaying a projected image according to any one of [1] to [5], in which a total thickness of layers of the reflection layer on the $\lambda/2$ phase difference layer side is greater than or equal to 0.5 mm.

[7] The member for displaying a projected image according to any one of [1] to [6], further comprising: a first glass plate; a second glass plate; and an interlayer between the first glass plate and the second glass plate, in which the reflection layer and the $\lambda/2$ phase difference layer are included in at least a part of the interlayer, and the first glass plate, the reflection layer, the $\lambda/2$ phase difference layer, and the second glass plate are laminated in this order.

[8] The member for displaying a projected image according to [7], in which the member for displaying a projected image is wind shield glass.

[9] The member for displaying a projected image according to [7] or [8], in which the interlayer is a resin film.

[10] The member for displaying a projected image according to [9], in which the resin film contains polyvinyl butyral.

[11] The member for displaying a projected image according to any one of [1] to [10], in which a slow axis of the λ/2 phase difference layer with respect to a vertical upper side at the time of using the member for displaying a projected image is in a range of +40° to +65° or in a range of −40° to −65°.

[12] The member for displaying a projected image according to any one of [1] to [10], in which the spiral senses of all of the cholesteric liquid crystal layers included in the reflection layer are right, a slow axis of the λ/2 phase difference layer with respect to a vertical upper side at the time of using the member for displaying a projected image is in a range of 40° to 65° in a clockwise direction as seen from the λ/2 phase difference layer side with respect to the reflection layer.

[13] The member for displaying a projected image according to any one of [1] to [10], in which the spiral senses of all of the cholesteric liquid crystal layers included in the reflection layer are left, and a slow axis of the λ/2 phase difference layer with respect to a vertical upper side at the time of using the member for displaying a projected image is in a range of 40° to 65° in a counterclockwise direction as seen from the λ/2 phase difference layer side with respect to the reflection layer.

[14] The member for displaying a projected image according to any one of [1] to [13], in which a half-width Δλ of a selective reflection range of one or more cholesteric liquid crystal layers is less than or equal to 50 nm.

[15] The member for displaying a projected image according to any one of [1] to [14], in which the λ/2 phase difference layer, the reflection layer, and a second phase difference layer are included in this order.

[16] The member for displaying a projected image according to [15], in which a slow axis of the second phase difference layer with respect to the vertical upper side at the time of using the member for displaying a projected image is in a range of +10° to +35° or in a range of −10° to −35°, and a phase difference of the second phase difference layer at a wavelength of 550 nm is 160 nm to 460 nm.

[17] The member for displaying a projected image according to [15], in which a slow axis of the second phase difference layer with respect to the vertical upper side at the time of using the member for displaying a projected image is in a range of +100° to +140° or in a range of −100° to −140°, and a phase difference of the second phase difference layer at a wavelength of 550 nm is 200 nm to 460 nm.

[18] The member for displaying a projected image according to any one of [1] to [17], in which the member for displaying a projected image is used as a combiner of a head up display.

[19] A projected image display system, comprising: the member for displaying a projected image according to any one of [1] to [18], in which the λ/2 phase difference layer is disposed on an incidence ray side with respect to the reflection layer, and the incidence ray is p-polarized light which vibrates in a direction parallel to an incidence surface.

[20] The projected image display system according to [19], in which the incidence ray is incident at an angle of 45° to 70° with respect to a normal line of the member for displaying a projected image.

[21] The projected image display system according to [19] or [20], in which the incidence ray is incident from a lower side at the time of using the member for displaying a projected image.

[22] The projected image display system according to any one of [19] to [21], in which the projected image display system is a head up display system.

The present invention provides a member for displaying a projected image from which a head up display system can be provided without a double image, and in which reflectivity of projection light is high, and transmittance of visible light is high. In addition, the present invention provides a head up display system which can display a clear image with high reflectivity and high transmittance without a double image.

In the head up display system of the present invention, a clear projected image can be observed even in a case of being observed by polarized sunglasses.

BRIEF DESCRIPTION OF THE DRAWINGS

FIG. 1 is a diagram illustrating arrangement of wind shield glass, a liquid crystal panel, and a luminance meter at the time of evaluating wind shield glass which is a member for displaying a projected image of an example.

DESCRIPTION OF THE PREFERRED
EMBODIMENTS

Hereinafter, the present invention will be described in detail.

In this specification, "to" is used as indication including numerical values before and after "to" as the lower limit value and the upper limit value.

In addition, in this specification, an angle (for example, an angle such as "90°") and a relationship thereof (for example, "parallel", "horizontal", "vertical", and the like) include an error range which is allowed in the technical field of the present invention. For example, the angle indicates that the angle is in a range of less than an exact angle ±10°, and an error from the exact angle is preferably less than or equal to 5°, and is more preferably less than or equal to 3°.

In this specification, "selective" applied to circular polarization indicates that the amount of light of one of a right circular polarization component and a left circular polarization component of light is greater than that of the other circular polarization component. Specifically, "selective" indicates that the degree of circular polarization of light is preferably greater than or equal to 0.3, is more preferably greater than or equal to 0.6, and is even more preferably greater than or equal to 0.8. Substantially, it is preferable that the degree of circular polarization of light is 1.0. Here, the degree of circular polarization is a value represented by $|I_R-I_L|/(I_R+I_L)$ at the time of setting an intensity of the right circular polarization component of the light to $I_R$ and an intensity of the left circular polarization component of the light to $I_L$. Herein, the degree of circular polarization is used in order to indicate a ratio of the circular polarization components of light.

In this specification, "sense" applied to circular polarization indicates whether the circular polarization is right circular polarization or left circular polarization. In the sense of the circular polarization, a case where a distal end of an electric field vector is rotated in a clockwise direction according to an increase in time in a case of watching the distal end such that light progresses towards the front is defined as the right circular polarization, and a case where the distal end is rotated in a counterclockwise direction is defined as the left circular polarization.

In this specification, the term of "sense" may be used for a spiral twisted direction of a cholesteric liquid crystal. In selective reflection of a cholesteric liquid crystal, in a case where the spiral twisted direction (sense) of the cholesteric liquid crystal is right, right circularly polarized light is reflected and left circularly polarized light is transmitted, and in a case where the sense is left, left circularly polarized light is reflected and right circularly polarized light is transmitted.

In this specification, "light" indicates light such as visible light and natural light (non-polarized light), unless otherwise particularly stated. A visible light ray is light having a wavelength visually observed among electromagnetic waves, and in general, indicates light in a wavelength range of 380 nm to 780 nm.

In this specification, measurement of a light intensity which is necessary in association with calculation of light transmittance, for example, may be performed by a general visible spectrometer using air as a reference.

In this specification, simply "reflection light" or "transmission light" is used as an indication including scattering light and diffraction light.

Furthermore, a polarization state of each wavelength of light can be measured by using a spectral emission luminance meter on which a circularly polarizing plate is mounted or a spectrometer. In this case, an intensity of light measured through a right circularly polarizing plate corresponds to $I_R$, and an intensity of light measured through a left circularly polarizing plate corresponds to $I_L$. In addition, a polarization state of a light source in which a general light source approximately emitting natural light, such as an incandescent bulb, a mercury lamp, a fluorescent lamp, and an LED, and a measurement target which is mounted on the light source, such as a filter are combined, for example, can be obtained by measuring wavelength dependency of circularly polarized light forming performance of a circularly polarized light separation film by using a polarization phase difference analysis device AXOSCAN or the like manufactured by Axometrics, Inc., and by multiplying wavelength dependency of a light emission intensity of the general light source measured by a separate spectrometer and a circularly polarized light forming performance value.

In addition, the measurement can be performed by attaching a circularly polarizing plate to an illuminometer or an optical spectrometer. The amount of right circularly polarized light is measured by attaching a right circularly polarized light transmission plate, and the amount of left circularly polarized light is measured by attaching a left circularly polarized light transmission plate, and thus, ratio can be measured.

In this specification, p-polarized light indicates polarized light which vibrates in a direction parallel to an incidence surface of light. The incidence surface indicates a surface including an incidence ray and a reflection light ray in a direction vertical to a reflection surface (a front surface of a member for displaying a projected image or the like). In the p-polarized light, a vibration surface of an electric field vector is parallel to the incidence surface.

In this specification, a front phase difference is a value measured by using AXOSCAN manufactured by AXOMETRICS, Inc. A measurement wavelength is set to 550 nm. In the front phase difference, a value measured by allowing light at a wavelength in a visible light wavelength range to be incident on KOBRA 21ADH or WR (manufactured by Oji Scientific Instruments) in a film normal direction can be used. In selection of a measurement wavelength, measurement can be performed by manually exchanging a wavelength selective filter or by converting a measured value with a program or the like In this specification, birefringence (Δn) of a liquid crystal compound is a value measured according to a method described on p. 214 of Liquid Crystal Basic Edition (edited by OKANO Mitsuharu and KOBAYASHI Shunsuke). Specifically, the liquid crystal compound is injected into a wedge-like cell to which a parallel alignment surface treatment has been subjected, and a distance between interference fringes is measured by using a polarization microscope which can observe the liquid crystal compound in light at a wavelength of 550 nm by mounting a dichroic filter, and thus, Δn at 60° C. can be obtained.

<Member for Displaying Projected Image>

In this specification, a member for displaying a projected image may be a member which can display a projected image in reflection light, and may be a member which can display a projected image projected from a projector or the like to be visible. The member for displaying a projected image may be a reflection member. Examples of the member for displaying a projected image include a projection screen, a half mirror for displaying a projected image, and the like. Examples of the half mirror for displaying a projected image include a combiner for a head up display, wind shield glass including a portion having the same combiner function, and the like.

The member for displaying a projected image of the present invention includes a reflection layer and a λ/2 phase difference layer. The member for displaying a projected image may include a layer such as an antireflection layer, an alignment layer, a support, an adhesive layer, and a substrate described below, in addition to the reflection layer and the λ/2 phase difference layer.

The member for displaying a projected image may be in the shape of a film, a sheet, a plate, or the like. The member for displaying a projected image may be in the shape of a flat surface which does not include a curved surface, may include a curved surface, or may have a concave or convex shape as a whole and display the projected image in an enlarged or reduced size. In addition, the member for displaying a projected image may adhere to other members and have the shapes described above, or may be in the shape of a roll or the like as a thin film before being combined.

In a case where the member for displaying a projected image is a half mirror for displaying a projected image, the member for displaying a projected image may have a function as a mirror or a half mirror with respect to at least light to be projected. For example, it is not necessary to function as a half mirror with respect to light in the entire visible light range. In addition, the member for displaying a projected image may have a function as the half mirror described above with respect to light having all incidence angles, and may have the function described above with respect to light having at least a part of an incidence angle.

It is preferable that the member for displaying a projected image has visible light-transmitting properties in order to enable information or scenery on an opposite surface side to be observed. The member for displaying a projected image may have light transmittance which is greater than or equal to 80%, is preferably greater than or equal to 90%, is more preferably greater than or equal to 100%, is greater than or equal to 40%, is preferably greater than or equal to 50%, is more preferably greater than or equal to 60%, and is even more preferably greater than or equal to 70%, with respect to a wavelength range of visible light. The light transmittance is set to light ray transmittance obtained by a method described in JIS-K7105.

Optical properties of the member for displaying a projected image with respect to ultraviolet light or infrared light other than the visible light range are not particularly limited, member for displaying a projected image and the member for displaying a projected image may transmit, reflect, or absorb the ultraviolet light or the infrared light, respectively. In order to prevent deterioration of the member for displaying a projected image, in order to perform heat insulation, in order to protect eyes of an observer, or the like, it is preferable to include an ultraviolet light reflection layer or an infrared light reflection layer.

[Reflection Layer]

The reflection layer is a layer reflecting light for displaying a projected image display, in the member for displaying a projected image of the present invention, indicates a layer included as a layer which can be distinguished from a phase difference layer. The reflection layer includes at least one cholesteric liquid crystal layer having selective reflection in a visible light range, and reflects light. The reflection layer may include two or more cholesteric liquid crystal layers, and may also include other layers such as a support and an alignment layer.

(Cholesteric Liquid Crystal Layer)

In this specification, the cholesteric liquid crystal layer indicates a layer formed by immobilizing a cholesteric liquid crystalline phase. The cholesteric liquid crystal layer may be simply referred to as a liquid crystal layer.

It is known that the cholesteric liquid crystalline phase has circularly polarized light selective reflection which selectively reflects circularly polarized light of any one sense of right circular polarization and left circular polarization and transmits circularly polarized light of the other sense. In this specification, the circularly polarized light selective reflection may be simply referred to as selective reflection.

From the related art, a film formed of a composition containing a polymerizable liquid crystal compound has been generally known as a film including a layer formed by immobilizing a cholesteric liquid crystalline phase having circularly polarized light selective reflection properties, and the cholesteric liquid crystal layer can be referred to a technology thereof in the related art.

The cholesteric liquid crystal layer may be a layer in which alignment of a liquid crystal compound formed of a cholesteric liquid crystalline phase is retained, and typically may be a layer in which the polymerizable liquid crystal compound is set to be in an alignment state of the cholesteric liquid crystalline phase and is subjected to ultraviolet ray irradiation, heating, or the like by polymerization and curing, and thus, a layer which does not have fluidity is formed and is simultaneously changed to a state where a change does not occurs in an alignment mode due to an external field or an external force. Furthermore, in the cholesteric liquid crystal layer, it is sufficient that optical properties of the cholesteric liquid crystalline phase are retained in the layer, and the liquid crystal compound of the layer may no longer exhibit liquid crystallinity. For example, the polymerizable liquid crystal compound may have a high molecular weight by a curing reaction, and may no longer have liquid crystallinity.

A center wavelength $\lambda$ of the selective reflection of the cholesteric liquid crystal layer depends on a pitch P (=a cycle of a spiral) of a spiral structure in a cholesteric phase, and depends on a relationship of $\lambda = n \times P$ with an average refractive index n of the cholesteric liquid crystal layer.

Furthermore, a center wavelength and a half-width of the selective reflection of the cholesteric liquid crystal layer can be obtained as described below.

In a case where a transmission spectrum (measured from a normal direction of the cholesteric liquid crystal layer) of the cholesteric liquid crystal layer is measured by using a spectrophotometer UV3150 (manufactured by SHIMADZU CORPORATION), a decreasing peak of transmittance is observed in a selective reflection range. In a case where, in two wavelengths which become transmittance of ½ of height of the highest peak, a value of a wavelength on a short wavelength side is set to $\lambda 1$ (nm), and a value of a wavelength on a long wavelength side is set to $\lambda 2$ (nm), the center wavelength $\lambda$ and a half-width $\Delta \lambda$ of the selective reflection can be represented by the following expressions.

$$\lambda = (\lambda 1 + \lambda 2)/2$$

$$\Delta \lambda = (\lambda 2 - \lambda 1)$$

The center wavelength of the selective reflection obtained as described above is approximately coincident with a wavelength on a centroid position of a reflection peak of a circularly polarized light reflection spectrum measured from the normal direction of the cholesteric liquid crystal layer.

As apparent from the relationship of $\lambda = n \times P$ described above, the center wavelength of the selective reflection can be adjusted by adjusting the pitch of the spiral structure. It is preferable that the cholesteric liquid crystal layer having selective reflection in a visible light range has a center wavelength of selective reflection in a visible light range. For example, in order to selectively reflect any one of right circularly polarized light and left circularly polarized light with respect to red light, green light, and blue light by adjusting an n value and a P value, the center wavelength $\lambda$ can be adjusted.

In a head up display system, it is preferable that oblique light is used to be incident on a reflection layer such that reflectivity on a glass front surface on a projection light incidence side becomes lower. Thus, in a case where the oblique light is incident on the cholesteric liquid crystal layer, the center wavelength of the selective reflection is shifted to a short wavelength side. For this reason, it is preferable to adjust $n \times P$ such that $\lambda$ which is calculated according to the expression of $\lambda = n \times P$ described above becomes a long wavelength with respect to a wavelength of selective reflection required for displaying a projected image. When a center wavelength of selective reflection at the time of allowing a light ray to pass at an angle of $\theta_2$ with respect to the normal direction (a spiral axis direction of the cholesteric liquid crystal layer) of the cholesteric liquid crystal layer in the cholesteric liquid crystal layer having a refractive index $n_2$ is set to $\lambda_d$, $\lambda_d$ is represented by the following expression.

$$\lambda_d = n_2 \times P \times \cos \theta_2$$

For example, light which is incident at an angle of 45° to 70° with respect to a normal line of the member for displaying a projected image from the $\lambda/2$ phase difference layer side in the air having a refractive index 1 is transmitted through the $\lambda/2$ phase difference layer generally having a refractive index of approximately 1.45 to 1.80 at an angle of 23° to 40° with respect to the normal line of the member for displaying a projected image, and is incident on the cholesteric liquid crystal layer having a refractive index of approximately 1.61. In the cholesteric liquid crystal layer, light is transmitted at an angle of 26° to 36°, and thus, n×P may be adjusted by inserting the angle and the center wavelength of the selective reflection to be obtained into the expression described above.

The pitch of the cholesteric liquid crystalline phase depends on the type of chiral agent used along with the polymerizable liquid crystal compound or an addition concentration thereof, and thus, a desired pitch can be obtained by adjusting the type of chiral agent or the addition concentration thereof. Furthermore, methods described in "Introduction to Liquid Crystal Chemical Test", Page 46, edited by Japan Liquid Crystal Society, published by Sigma Publications, 2007, and "Liquid Crystal Handbook", Page 196, Liquid Crystal Handbook Editing Committee Maruzen can be used as a measurement method of the sense of the spiral or the pitch.

A cholesteric liquid crystal layer in which a sense of a spiral is either right or left is used as each of the cholesteric liquid crystal layers. The sense of the reflection circular polarization of the cholesteric liquid crystal layer is coincident with the sense of the spiral.

In the half-width $\Delta\lambda$ (nm) of the selective reflection range exhibiting selective reflection, $\Delta\lambda$ depends on birefringence $\Delta n$ of the liquid crystal compound and the pitch P described above, and depends on a relationship of $\Delta\lambda=\Delta n\times P$. For this reason, the width of the selective reflection range can be controlled by adjusting $\Delta n$. $\Delta n$ can be adjusted by adjusting the type of polymerizable liquid crystal compound or a mixing ratio thereof or by controlling a temperature at the time of immobilizing alignment.

In order to form one type of cholesteric liquid crystal layer having the same center wavelength of selective reflection, a plurality of cholesteric liquid crystal layers having the same pitch P and the same sense of the spiral may be laminated. By laminating the cholesteric liquid crystal layers having the same pitch P and the same sense of the spiral, it is possible to increase circular polarization selectivity in a specific wavelength.

The width of the selective reflection range, for example, is approximately 15 nm to 100 nm in a visible light range, in general, in one type of material. In order to increase the width of the selective reflection range, two or more cholesteric liquid crystal layers having different center wavelengths of reflection light in which the pitch P is changed may be laminated. At this time, it is preferable that cholesteric liquid crystal layers having the same sense of the spiral are laminated. In addition, in one cholesteric liquid crystal layer, it is possible to increase the width of the selective reflection range by gradually changing the pitch P with respect to a film thickness direction. The width of the selective reflection range is not particularly limited, and may be a wavelength width of 1 nm, 10 nm, 50 nm, 100 nm, 150 nm, 200 nm, or the like. It is preferable that the width is approximately less than or equal to 100 nm.

It is preferable that the reflection layer has a center wavelength of apparent selective reflection with respect to each of red light, green light, and blue light. The center wavelength of the apparent selective reflection indicates a wavelength on a centroid position of a reflection peak of a circularly polarized light reflection spectrum of a cholesteric liquid crystal layer measured from an observation direction at the time of being actually used. This is because a full color projected image can be displayed. The properties described above can be attained by a configuration including three or more types of cholesteric liquid crystal layers as the reflection layer. Specifically, a configuration including three or more types of cholesteric liquid crystal layers which have different pitches P, and thus, have different center wavelengths of selective reflection may be used. Specifically, it is preferable that the reflection layer includes a cholesteric liquid crystal layer which selectively reflects red light, a cholesteric liquid crystal layer which selectively reflects green light, and a cholesteric liquid crystal layer which selectively reflects blue light. For example, it is preferable that the reflection layer includes a cholesteric liquid crystal layer having center wavelength of selective reflection in 490 nm to 570 nm, a cholesteric liquid crystal layer having a center wavelength of selective reflection in 580 nm to 680 nm, and a cholesteric liquid crystal layer having a center wavelength of selective reflection in 700 nm to 830 nm. Furthermore, the center wavelength of the selective reflection described herein is a center wavelength at the time of being measured from the normal direction of the cholesteric liquid crystal layer.

The center wavelength of the selective reflection of the cholesteric liquid crystal layer to be used is adjusted according to a light emission wavelength range of a light source to be used in projection and a use aspect of the reflection layer, and thus, a clear projected image can be displayed with excellent light utilization efficiency. In particular, each center wavelength of selective reflection of a plurality of cholesteric liquid crystal layers is adjusted according to a light emission wavelength range of a light source to be used in projection or the like, and thus, a clear color projected image can be displayed with excellent light utilization efficiency. In particular, examples of the use aspect of the reflection layer include an incidence angle of a projection light onto the reflection layer, an observation direction of a projected image on a front surface of the reflection layer, and the like.

The senses of the spirals of the cholesteric liquid crystal layers having different center wavelengths of the selective reflection may be entirely identical to each other, or may be different from each other, but it is preferable that the senses of the spirals of the cholesteric liquid crystal layers are entirely identical to each other.

When the plurality of cholesteric liquid crystal layers are laminated, cholesteric liquid crystal layers separately prepared may be laminated by using an adhesive or the like, or a liquid crystal composition containing a polymerizable liquid crystal compound or the like may be directly applied onto a front surface of a cholesteric liquid crystal layer which is formed in advance by the following method, and an alignment step and an immobilization step may be repeated, and the latter is preferable. This is because an alignment azimuth of liquid crystal molecules on an air interface side of the cholesteric liquid crystal layer formed in advance is coincident with an alignment azimuth of liquid crystal molecules on a lower side of the cholesteric liquid crystal layer formed thereon, and polarization properties of a laminate of the cholesteric liquid crystal layers become excellent by directly forming the next cholesteric liquid crystal layer on the front surface of the cholesteric liquid crystal layer formed in advance. In addition, this is because in a case where an adhesive layer having a film thickness of generally 0.5 to 10 μm is used, interference unevenness derived from thickness unevenness of the adhesive layer is observed, and thus, it is preferable that the cholesteric liquid crystal layers are laminated without using the adhesive layer.

(Preparation Method of Layer Formed by Immobilizing Cholesteric Liquid Crystalline Phase)

Hereinafter, a preparation material and a preparation method of the cholesteric liquid crystal layer will be described.

Examples of the material used for forming the cholesteric liquid crystal layer include a liquid crystal composition containing a polymerizable liquid crystal compound and a chiral agent (an optical active compound), and the like. As necessary, the liquid crystal composition which is mixed with a surfactant, a polymerization initiator, or the like and is dissolved in a solvent or the like is applied onto a support, an alignment film, a cholesteric liquid crystal layer which becomes an underlayer, and the like, cholesteric alignment is matured, and then, is immobilized by curing the liquid crystal composition, and thus, the cholesteric liquid crystal layer can be formed.

(Polymerizable Liquid Crystal Compound)

The polymerizable liquid crystal compound may be a rod-like liquid crystal compound, or a disk-like liquid crystal compound, and it is preferable that the polymerizable liquid crystal compound is a rod-like liquid crystal compound.

Examples of a rod-like polymerizable liquid crystal compound forming the cholesteric liquid crystal layer include a rod-like nematic liquid crystal compound. Azomethines, azoxys, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles are preferably used as the rod-like nematic liquid crystal compound. Not only a low molecular liquid crystal compound but also a high molecular liquid crystal compound can be used.

The polymerizable liquid crystal compound can be obtained by introducing a polymerizable group into a liquid crystal compound. Examples of the polymerizable group include an unsaturated polymerizable group, an epoxy group, and an aziridinyl group, and an unsaturated polymerizable group is preferable, and an ethylenically unsaturated polymerizable group is particularly preferable. The polymerizable group can be introduced into the molecules of the liquid crystal compound by various methods. The number of polymerizable groups of the polymerizable liquid crystal compound is preferably 1 to 6, and is more preferably 1 to 3. Examples of the polymerizable liquid crystal compound include compounds described in Makromol. Chem., Vol. 190, Page 2255 (1989), Advanced Materials Vol. 5, Page 107 (1993), the specifications of U.S. Pat. Nos. 4,683,327A, 5,622,648A, and 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like. Two or more types of polymerizable liquid crystal compounds may be combined. In a case where two or more types of polymerizable liquid crystal compounds are combined, it is possible to decrease an alignment temperature.

In addition, the added amount of the polymerizable liquid crystal compound to the liquid crystal composition is preferably 80 to 99.9 mass %, is more preferably 85 to 99.5 mass %, is particularly preferably 90 to 99 mass %, with respect to the mass of solid contents of the liquid crystal composition (a mass excluding a solvent).

(Low Δn Polymerizable Liquid Crystal Compound)

As apparent from the expression of the half-width Δλ of the selective reflection range exhibiting the selective reflection described above, a cholesteric liquid crystalline phase is formed by using a low Δn polymerizable liquid crystal compound, and a film is formed by immobilizing the cholesteric liquid crystalline phase, and thus, a reflection film having a narrow wavelength range of selective reflection, that is, a reflection film having high selectivity in a reflection wavelength range can be obtained. Examples of the low Δn polymerizable liquid crystal compound include compounds described in WO2015/115390A, and a compound represented by Formula (I) described below.

Formula (I):

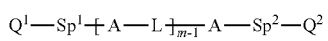

In the formula,

A represents a phenylene group which may have a substituent or a trans-1,4-cyclohexylene group which may have a substituent. Here, the compound represented by Formula (I) includes at least one phenylene group which may have a substituent and at least one trans-1,4-cyclohexylene group which may have a substituent.

L represents a linking group selected from the group consisting of a single bond, —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a linking group selected from the group consisting of single bond, a linear alkylene group or a branched alkylene group having 1 to 20 carbon atoms, and a group in which one or two or more —CH$_2$—'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, and Q$^1$ and Q$^2$ each independently represents a polymerizable group selected from the group consisting of a hydrogen atom or groups represented by Formula Q-1 to Formula Q-5, and here, any one of Q$^1$ and Q$^2$ represents a polymerizable group.

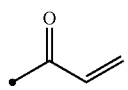

Q-1

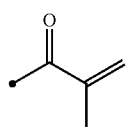

Q-2

Q-3

Q-4

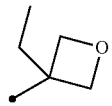

Q-5

Preferred examples of the compound represented by Formula (I) include a compound represented by Formula (II-2) described below.

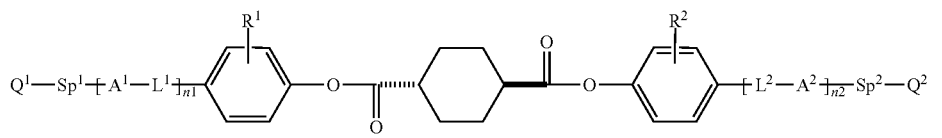

(II-2)

In the formula, $A^1$ and $A^2$ each independently represent a phenylene group which may have a substituent or a trans-1,4-cyclohexylene group which may have a substituent. At this time, all of the substituents described above may be each independently 1 to 4 substituents selected from the group consisting of an alkyl group, an alkoxy group, and —C(=O)—$X^3$-$Sp^3$-$Q^3$. $R^1$ and $R^2$ each independently represent a group selected from the group consisting of a hydrogen atom, an alkyl group, an alkoxy group, and a group represented by —C(=O)—$X^3$-$Sp^3$-$Q^3$. Here, $X^3$ represents a single bond, —O—, —S—, or —N($Sp^4$-$Q^4$)-, or represents nitrogen atom which forms a cyclic structure along with $Q^3$ and $Sp^3$. It is preferable that $X^3$ is a single bond or —O—. $Sp^3$ and $Sp^4$ each independently represent a linking group selected from the group consisting of a single bond, a linear alkylene group or a branched alkylene group having 1 to 20 carbon atoms, and a group in which one or two or more —$CH_2$—'s in the linear alkylene group or the branched alkylene group having 1 to 20 carbon atoms are substituted with —O—, —S—, —NH—, —N($CH_3$)—, —C(=O)—, —OC(=O)—, or —C(=O)O—. $Q^3$ and $Q^4$ each independently represent any one polymerizable group selected from the group consisting of a hydrogen atom, a cycloalkyl group, a group in which one or two or more —$CH_2$—'s in the cycloalkyl group are substituted with —O—, —S—, —NH—, —N($CH_3$)—, —C(=O)—, —OC(=O)—, or —C(=O)O—, or groups represented by Formula Q-1 to Formula Q-5.

It is preferable that $R^1$ and $R^2$ is —C(=O)—$X^3$-$Sp^3$-$Q^3$. In addition, it is preferable that $R^1$ and $R^2$ are identical to each other. A bonding position of each of $R^1$ and $R^2$ with respect to a phenylene group is not particularly limited.

$L^1$ and $L^2$ represent a linking group selected from the group consisting of a single bond, —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. In addition, n1 and n2 each independently represent an integer of 0 to 9, and n1+n2 is less than or equal to 9.

It is preferable that Formula (II-2) has a structure in which a phenylene group which may have a substituent and a trans-1,4-cyclohexylene group which may have a substituent (preferably, a non-substituted trans-1,4-cyclohexylene group) are alternately arranged.

(Chiral Agent: Optical Active Compound)

A chiral agent has a function of inducing a spiral structure of the cholesteric liquid crystalline phase. Senses or spiral pitches of a spiral induced are different according to a compound, and thus, a chiral compound may be selected according to the purpose.

The chiral agent is not particularly limited, a known compound (for example, described in Liquid Crystal Device Handbook, Chapter 3, Paragraph 4-3, Chiral Agent for TN and STN, Page 199, Japan Society for the Promotion of Science edited by 142nd committee, 1989), and derivatives of isosorbide and isomannide can be used.

In general, the chiral agent includes an asymmetric carbon atom, but an axial asymmetric compound or a planar asymmetric compound which does not include an asymmetric carbon atom can also be used as the chiral agent. Examples of the axial asymmetric compound or the planar asymmetric compound include binaphthyl, helicene, paracyclophane, and derivatives thereof. The chiral agent may have a polymerizable group. In a case where both of the chiral agent and the liquid crystal compound have a polymerizable group, a polymer having a repeating unit derived from the polymerizable liquid crystal compound and a repeating unit derived from the chiral agent can be formed by a polymerization reaction between the polymerizable chiral agent and the polymerizable liquid crystal compound. In this embodiment, it is preferable that the polymerizable group of the polymerizable chiral agent is identical to the polymerizable group of the polymerizable liquid crystal compound. Accordingly, it is preferable that the polymerizable group of the chiral agent is also an unsaturated polymerizable group, an epoxy group, or an aziridinyl group, an unsaturated polymerizable group is more preferable, and an ethylenically unsaturated polymerizable group is particularly preferable.

In addition, the chiral agent may be a liquid crystal compound.

The content of the chiral agent in the liquid crystal composition is preferably 0.01 mol % to 200 mol %, and is more preferably 1 mol % to 30 mol %, with respect to the amount of polymerizable liquid crystal compound.

(Polymerization Initiator)

It is preferable that the liquid crystal composition contains a polymerization initiator.

In an embodiment where a polymerization reaction progresses by ultraviolet ray irradiation, it is preferable that a polymerization initiator to be used is a photopolymerization initiator which can initiate a polymerization reaction by ultraviolet ray irradiation. Examples of the photopolymerization initiator include an α-carbonyl compound (described in each of the specifications of U.S. Pat. Nos. 2,367,661A and 2,367,670A), acyloin ether (described in the specification of U.S. Pat. No. 2,448,828A), an α-hydrocarbon-substituted aromatic acyloin compound (described in the specification of U.S. Pat. No. 2,722,512A), a polynuclear quinone compound (described in each of the specifications of U.S. Pat. Nos. 3,046,127A and 2,951,758A), a combination of a triaryl imidazole dimer and p-aminophenyl ketone (described in the specification of U.S. Pat. No. 3,549,367A), an acridine compound and phenazine compound (described in JP-1985-105667A (JP-S60-105667A) and the specification of U.S. Pat. No. 4,239,850A), an oxadiazole compound (described in the specification of U.S. Pat. No. 4,212,970A), and the like.

The content of the photopolymerization initiator in the liquid crystal composition is preferably 0.1 to 20 mass %, and is more preferably 0.5 mass % to 5 mass %, with respect to the content of the polymerizable liquid crystal compound.

(Cross-Linking Agent)

The liquid crystal composition may arbitrarily contain a cross-linking agent in order to improve the film strength and durability after curing. A cross-linking agent which is cured by an ultraviolet ray, heat, humidity, and the like can be suitably used as the cross-linking agent.

The cross-linking agent is not particularly limited, but can be suitably selected according to the purpose, and examples of the cross-linking agent include a polyfunctional acrylate compound such as trimethylol propane tri(meth)acrylate and pentaerythritol tri(meth)acrylate; an epoxy compound such as glycidyl (meth)acrylate and ethylene glycol diglycidyl ether; an aziridine compound such as 2,2-bishydroxy methyl butanol-tris[3-(l-aziridinyl) propionate] and 4,4-bis(ethylene iminocarbonyl amino) diphenyl methane; an isocyanate compound such as hexamethylene diisocyanate and biuret type isocyanate; a polyoxazoline compound having an oxazoline group in a side chain; an alkoxy silane compound such as vinyl trimethoxy silane and N-(2-aminoethyl)-3-aminopropyl trimethoxy silane, and the like. In addition, a known catalyst can be used according to reactivity of the cross-linking agent, and improvement of productivity can be attained in addition to improvement of film strength and durability improvement. One type of the cross-linking agent may be independently used, or two or more types thereof may be used in combination.

The content of the cross-linking agent is preferably 3 mass % to 20 mass %, and is more preferably 5 mass % to 15 mass %. In a case where the content of the cross-linking agent is less than 3 mass %, an effect of improving the density of the cross-linking is not obtained, and in a case where the content of the cross-linking agent is greater than 20 mass %, stability of the cholesteric liquid crystal layer may decrease.

(Alignment Control Agent)

An alignment control agent may be added to the liquid crystal composition in order to stably or rapidly contribute to the formation of a cholesteric liquid crystal layer having planar alignment. Examples of the alignment control agent include a fluorine (meth)acrylate-based polymer described in paragraphs [0018] to [0043] and the like of JP2007-272185A, compounds denoted by Formulas (I) to (IV) described in paragraphs [0031] to [0034] and the like of JP2012-203237A, and the like.

Furthermore, one type of the alignment control agent may be independently used, or two or more types thereof may be used in combination.

The added amount of the alignment control agent to the liquid crystal composition is preferably 0.01 mass % to 10 mass %, is more preferably 0.01 mass % to 5 mass %, and is particularly preferably 0.02 mass % to 1 mass %, with respect to the total mass of the polymerizable liquid crystal compound.

(Other Additives)

In addition to the additives described above, the liquid crystal composition may contain at least one selected from various additives such as a surfactant for making a film thickness even by adjusting a surface tension of a coated film, a polymerizable monomer, and the like. In addition, a polymerization inhibitor, an antioxidant, an ultraviolet absorbent, a light stabilizer, a coloring material, metal oxide fine particles, and the like can be further added to the liquid crystal composition, as necessary, in a range where optical performance does not decrease.

The cholesteric liquid crystal layer can form a cholesteric liquid crystal layer in which cholesteric regularity is immobilized by applying the liquid crystal composition in which the polymerizable liquid crystal compound and the polymerization initiator, and the chiral agent, the surfactant, and the like, added as necessary, are dissolved in a solvent onto the support, the alignment layer, the cholesteric liquid crystal layer prepared in advance, and the like, by drying the liquid crystal composition, by obtaining a coated film, by irradiating the coated film with an active light ray, and by polymerizing the cholesteric liquid crystal composition. Furthermore, a laminated film formed of a plurality of cholesteric liquid crystal layers can be formed by repeatedly performing a manufacturing step of the cholesteric liquid crystal layer.

(Solvent)

The solvent used for preparing the liquid crystal composition is not particularly limited, but can be suitably selected according to the purpose, and an organic solvent is preferably used.

The organic solvent is not particularly limited, but can be suitably selected according to the purpose, and examples of the organic solvent include ketones, alkyl halides, amides, sulfoxides, a heterocyclic compound, hydrocarbons, esters, ethers, and the like. One type of the organic solvent may be independently used, or two or more types thereof may be used in combination. Among them, the ketones are particularly preferable in consideration of a load on the environment.

(Coating, Alignment, and Polymerization)

A coating method of the liquid crystal composition with respect to the cholesteric liquid crystal layer or the like which becomes a support, an alignment film, and an underlayer is not particularly limited, but can be suitably selected according to the purpose, and examples of the coating method include a wire bar coating method, a curtain coating method, an extruding coating method, a direct gravure coating method, a reverse gravure coating method, a die coating method, a spin coating method, a dip coating method, a spray coating method, a slide coating method, and the like. In addition, the coating method can be performed by transferring a liquid crystal composition applied onto a separate support. The coated liquid crystal composition is heated, and thus, liquid crystal molecules are aligned. A heating temperature is preferably lower than or equal to 200° C., and is more preferably lower than or equal to 130° C. By this alignment treatment, an optical thin film can be obtained in which the polymerizable liquid crystal compound is subjected to twisted alignment such that the polymerizable liquid crystal compound has a spiral axis in a direction substantially vertical to a film surface.

The aligned liquid crystal compound is further polymerized, and thus, the liquid crystal composition can be cured. The polymerization may be either thermal polymerization or photopolymerization of light irradiation, and the photopolymerization is preferable. It is preferable that the light irradiation is performed by using an ultraviolet ray. Irradiation energy is preferably 20 mJ/cm$^2$ to 50 J/cm$^2$, and is more preferably 100 mJ/cm$^2$ to 1,500 mJ/cm$^2$. In order to accelerate a photopolymerization reaction, light irradiation may be performed under heating conditions or under a nitrogen atmosphere. It is preferable that an irradiation wavelength of the ultraviolet ray is 350 nm to 430 nm. It is preferable that polymerization reactivity is high from the viewpoint of stability, and the polymerization reactivity is preferably greater than or equal to 70%, and is more preferably greater than or equal to 80%. The polymerization reactivity can be determined by measuring a consumption ratio of a polymerizable functional group by using an IR absorption spectrum.

[λ/2 Phase Difference Layer]

The present inventors have surprisingly found that a clear projected image can be displayed not by using a λ/4 phase difference layer changing linearly p-polarized light to circularly polarized light, but by using the λ/2 phase difference layer and the reflection layer described above in combination. As described in examples described below, in the member for displaying a projected image prepared by combining the λ/2 phase difference layer and the reflection layer described above, a higher luminance is applied, compared to a member for displaying a projected image using a λ/4 phase difference layer and the reflection layer described above in combination. In addition, it is also possible to prevent a double image.

A front phase difference of the λ/2 phase difference layer may be a length of ½ of a visible light wavelength range, or "½ of Center Wavelength*n±Center Wavelength (n is an integer)". In particular, the front phase difference of the λ/2 phase difference layer may a length of ½ of a reflection wavelength of the reflection layer (for example, any cholesteric liquid crystal) or a center wavelength of a light emission wavelength of a light source. For example, the phase difference may be in a range of 190 nm to 390 nm, and it is preferable that the phase difference is in a range of 200 nm to 350 nm.

The λ/2 phase difference layer is not particularly limited, but can be suitably selected according to the purpose, and examples of the λ/2 phase difference layer include a stretched polycarbonate film, a stretched norbornene-based polymer film, a transparent film in which inorganic particles having birefringence, such as strontium carbonate, are contained and are aligned, a film in which liquid crystal compounds are subjected to monoaxial alignment, and the alignment is immobilized, a thin film in which an inorganic dielectric body is subjected to oblique vapor deposition on a support, and the like.

The thickness of the λ/2 phase difference layer is preferably 0.2 μm to 300 μm, is more preferably 0.5 μm to 150 μm, and is even more preferably 1 μm to 80 μm.

It is preferable that a slow axis direction of the λ/2 phase difference layer is determined according to an incidence direction of an incidence ray for displaying a projected image and the sense of the spiral of the cholesteric liquid crystal layer, at the time of being used as a projected image display system. For example, in a case where an incidence ray is incident in a lower (a vertical lower) direction of the member for displaying a projected image with respect to the reflection layer from the λ/2 phase difference layer side (in this specification, may referred to as "from the observer side"), it is preferable that a slow axis of the λ/2 phase difference layer is in a range of +40° to +65°, or is in a range of −40° to −65°, with respect to a vertical upper side at the time of using the member for displaying a projected image. In addition, it is preferable that the slow axis direction is set according to the sense of the spiral of the cholesteric liquid crystal layer of the reflection layer, as described below. In a case where the sense described above is right, (preferably, in a case where senses of all of the cholesteric liquid crystal layers are right), the slow axis of the λ/2 phase difference layer is in a range of 40° to 65° in a clockwise direction as seen from the observer side, and is preferably in a range of 45° to 60°, with respect to the vertical upper side at the time of using the member for displaying a projected image. In a case where the sense described above is left (preferably, in a case where senses of all of the cholesteric liquid crystal layers are left), the slow axis of the λ/2 phase difference layer is in a range of 40° to 65° in a counterclockwise direction as seen from the observer side, and is preferably in a range of 45° to 60°, with respect to the vertical upper side at the time of using the member for displaying a projected image.

[Second Phase Difference Layer]

The member for displaying a projected image of the present invention may include a second phase difference layer in addition to the λ/2 phase difference layer. The second phase difference layer may be disposed such that the λ/2 phase difference layer, the reflection layer, and the second phase difference layer are in this order. In particular, the λ/2 phase difference layer, the reflection layer, and the second phase difference layer may be disposed in this order from a side which becomes the observer side at the time of being used. In this specification, even in a case where the second phase difference layer has a λ/2 phase difference, the second phase difference layer is referred in order to be distinguished from the λ/2 phase difference layer which is closer to the observer side. By disposing the second phase difference layer in the position described above, it is possible to further prevent a double image. In particular, it is possible to further prevent a double image in a case where a projected image is formed by allowing p-polarized light to be incident. The effect becomes more considerable in a case where the low Δn polymerizable liquid crystal compound is used for forming the cholesteric liquid crystal layer of the reflection layer.

It is assumed that the reason that a double image can be further prevented by using the second phase difference layer is because it is possible to prevent a double image which is generated by performing polarization conversion with respect to light having a wavelength not in the selective reflection range of the cholesteric liquid crystal layer of the reflection layer in the cholesteric liquid crystal layer, and by reflecting the light on a rear surface of wind shield glass.

A phase difference of the second phase difference layer may be suitably adjusted in a range of 160 nm to 460 nm, and is preferably in a range of 240 nm to 420 nm, at a wavelength of 550 nm.

A material, a film thickness, or the like of the second phase difference layer can be selected in the same ranges as those of the λ/2 phase difference layer.

It is preferable that a slow axis direction of the second phase difference layer is determined according to the incidence direction of the incidence ray for displaying a projected image display and the sense of the spiral of the cholesteric liquid crystal layer, at the time of being used as the projected image display system. For example, in the second phase difference layer having a phase difference in a range of 160 nm to 400 nm at a wavelength of 550 nm, it is preferable that the slow axis is in a range of +10° to +35° or in a range of −10° to −35°, with respect to the vertical upper side at the time of using the member for displaying a projected image. Alternatively, in the second phase difference layer having a phase difference in a range of 200 nm to 400 nm at a wavelength of 550 nm, it is preferable that the slow axis is in a range of +100° to +140° or in a range of −100° to −140°, with respect to the vertical upper side at the time of using the member for displaying a projected image.

[Other Layers]

The member for displaying a projected image of the present invention may include other layers in addition to the cholesteric liquid crystal layer and the λ/2 phase difference layer. It is preferable that all of the other layers are transparent in a visible light range. In this specification, being transparent in the visible light range indicates that transmittance of visible light is greater than or equal to 70%.

In addition, it is preferable that all of the other layers have low birefringence. In this specification, the low birefringence indicates that a front phase difference is less than or equal to 10 nm in a wavelength range where the member for displaying a projected image of the present invention has reflection, and it is preferable that the front phase difference described above is less than or equal to 5 nm. Further, it is preferable that all of the other layers have small difference between refractive indices thereof and an average refractive index (an in-plane average refractive index) of the cholesteric liquid crystal layer. Examples of the other layers include a support, an alignment layer, an adhesive layer, a substrate, and the like.

(Support)

The member for displaying a projected image may include a support which becomes a substrate at the time of forming the cholesteric liquid crystal layer or the $\lambda/2$ phase difference layer.

The support is not particularly limited. The support used for forming the cholesteric liquid crystal layer or the $\lambda/2$ phase difference layer is a temporary support which is peeled off after forming the cholesteric liquid crystal layer, and may be included in the member for displaying a projected image. Examples of the support include a plastic film such as polyester such as polyethylene terephthalate (PET), polycarbonate, an acrylic resin, an epoxy resin, polyurethane, polyamide, polyolefin, a cellulose derivative, silicone. Glass may be used as the temporary support, in addition to the plastic film described above.

A film thickness of the support may be approximately 5 μm to 1,000 μm, is preferably 10 μm to 250 μm, and is more preferably 15 μm to 90 μm.

(Alignment Layer)

The member for displaying a projected image may include an alignment layer as an underlayer which is coated with a liquid crystal composition at the time of forming the cholesteric liquid crystal layer or the $\lambda/2$ phase difference layer.

The alignment layer can be disposed by means such as a rubbing treatment of an organic compound such as a polymer (a resin such as polyimide, polyvinyl alcohol, polyester, polyarylate, polyamide imide, polyether imide, polyamide, and modified polyamide), oblique vapor deposition of an inorganic compound, formation of a layer having a microgroove, or the accumulation of an organic compound (for example, an ω-tricosanoic acid, dioctadecyl methyl ammonium chloride, and methyl stearate) using a LANGMUIR-BLODGETT method (an LB film). Further, an alignment film may be used in which an alignment function occurs by application of an electric field, application of a magnetic field, or light irradiation.

In particular, it is preferable that an alignment film formed of a polymer is subjected to a rubbing treatment, and then, a liquid crystal composition is applied onto a rubbing treatment surface. The rubbing treatment can be performed by rubbing the surface of the polymer layer with paper and cloth in a constant direction a plurality of times.

The liquid crystal composition may be applied onto a front surface of the support or a front surface of the support which is subjected to the rubbing treatment without disposing the alignment film.

In a case where the liquid crystal layer is formed by using the temporary support, the alignment film may not become a layer configuring the member for displaying a projected image by being peeled off along with the temporary support.

The thickness of the alignment layer is preferably 0.01 to 5 μm, and is more preferably 0.05 to 2 μm.

(Adhesive Layer)

The member for displaying a projected image may include an adhesive layer in order to allow each of the layers to adhere to each other. The adhesive layer, for example, may be disposed between the cholesteric liquid crystal layers, between the reflection layer and the $\lambda/2$ phase difference layer, between the cholesteric liquid crystal layer and the support, between the reflection layer and an intermediate film sheet, between the $\lambda/2$ phase difference layer and the intermediate film sheet, and the like.

The adhesive layer may be formed of an adhesive.

Examples of the adhesive include a hot melt type adhesive, a thermal curing type adhesive, a photocuring type adhesive, a reaction curing type adhesive, and a pressure sensitive adhesion type adhesive in which curing is not necessary, and a compound such as an acrylate-based compound, a urethane-based compound, a urethane acrylate-based compound, an epoxy-based compound, an epoxy acrylate-based compound, a polyolefin-based compound, a modified olefin-based compound, a polypropylene-based compound, an ethylene vinyl alcohol-based compound, a vinyl chloride-based compound, a chloroprene rubber-based compound, a cyanoacrylate-based compound, a polyamide-based compound, a polyimide-based compound, a polystyrene-based compound, and a polyvinyl butyral-based compound can be used as a material of each adhesive. From the viewpoint of workability and productivity, the photocuring type adhesive is preferable as a curing method, and from the viewpoint of optical transparency and heat resistance, the acrylate-based compound, the urethane acrylate-based compound, the epoxy acrylate-based compound, and the like are preferably used as the material.

A film thickness of the adhesive layer may be 0.5 to 10 μm, and may be preferably 1 to 5 μm. In order to reduce color unevenness or the like of the member for displaying a projected image, it is preferable that the film thickness becomes even.

(Substrate)

The member for displaying a projected image may include a substrate. The substrate may be identical to the support which is used at the time of forming the cholesteric liquid crystal layer, or may be disposed separately from the support.

Other products such as front glass of a vehicle may function as the substrate. In addition, as with the example described below in which the member for displaying a projected image is the wind shield glass, a glass plate which is used for forming the wind shield glass may function as the substrate. The substrate may be on the $\lambda/2$ phase difference layer side from the reflection layer, may be on a side opposite to the $\lambda/2$ phase difference layer side, or may be on both sides, but it is preferable that the substrate is on at least the $\lambda/2$ phase difference layer side. That is, it is preferable that the member for displaying a projected image of the present invention has a configuration including the reflection layer, the $\lambda/2$ phase difference layer, and the substrate in this order.

The same materials as those exemplified in the support can be used as the substrate. In addition, the film thickness of the substrate may be the same film thickness as that of the support described above, and may be greater than 1000 μm, or may be greater than or equal to 10 mm. In addition, the film thickness of the substrate may be less than or equal to 200 mm, may be less than or equal to 100 mm, may be less than or equal to 80 mm, may be less than or equal to 60 mm, may be less than or equal to 50 mm, may be less than or equal to 40 mm, may be less than or equal to 30 mm, may be less than or equal to 20 mm, and the like.

In the member for displaying a projected image of the present invention, the cholesteric liquid crystal layer may be disposed on one surface of the substrate, and it is preferable that the cholesteric liquid crystal layer is not disposed on the other surface.

In a case where a projected image is viewed on the surface on which the cholesteric liquid crystal layer is disposed, a double image is observed by a interface reflection on the surface of the substrate on a side opposite to the surface of the substrate on which the cholesteric liquid crystal layer is disposed or an air surface of the other layer which is disposed on the surface. In order to prevent such a phenomenon, an antireflection layer may be disposed on the surface of the substrate on the opposite side.

It is preferable that the substrate is transparent in a visible light range and has low birefringence.

Examples of the substrate having low birefringence which is transparent in a visible light range include an inorganic glass or a polymer resin. The organic material having low birefringence which is used in an optical disk substrate in which birefringence causes hindrance of image formation or signal noise, a pickup lens, a lens for a camera, a microscope, or a video camera, a substrate for a liquid crystal display, a prism, an optical interconnection component, an optical fiber, a light guide plate for a liquid crystal display, a lens for a laser beam printer, a projector, or a facsimile, a fresnel lens, a contact lens, a polarizing plate protective film, a micro lens array, and the like can be similarly used as the polymer resin having low birefringence.

Specific examples of a polymer resin material which can be used for this object can include an acrylic resin (acrylic acid esters or the like such as polymethyl (meth)acrylate), polycarbonate, polycarbonate, cyclic polyolefin such as cyclopentadiene-based polyolefin or norbornene-based polyolefin, polyolefins such as polypropylene, aromatic vinyl polymers such as polystyrene, polyarylate, and cellulose acylate.

[Layer on Visible Side with Respect to Reflection Layer]

In general, in the member for displaying a projected image, an image of reflection light from a layer reflecting projection light and an image of reflection light from a front surface of the member for displaying a projected image as seen from a light incidence side or a rear side surface are superimposed, and thus, a problem of a double image (or a multiple image) occurs. In the member for displaying a projected image of the present invention, light which is transmitted through the cholesteric liquid crystal layer in the reflection layer becomes circularly polarized light of a sense opposite to that of circularly polarized light which is reflected on the cholesteric liquid crystal layer described above, and in a case where a layer on the rear side surface side from the reflection layer has low birefringence, in general, the reflection light from the rear side surface is mostly the circularly polarized light which is reflected on the cholesteric liquid crystal layer described above, and thus, rarely generates a considerable double image. In particular, the projection light can be configured such that most of projection light is reflected on the reflection layer by using polarization. On the other hand, the reflection light from the front surface can generate a considerable double image. In particular, in a case where a distance from the centroid of the cholesteric liquid crystal layer to the front surface of the member for displaying a projected image as seen from the light incidence side has greater than or equal to a certain value, a double image becomes considerable. Specifically, in the structure of the member for displaying a projected image of the present invention, in a case where the total thickness of a layer on the $\lambda/2$ phase difference layer side from the reflection layer (including the thickness of the $\lambda/2$ phase difference layer, but not the thickness of the reflection layer), that is, a distance from the outermost surface of the reflection layer on the $\lambda/2$ phase difference layer side to the outermost surface of the member for displaying a projected image on the $\lambda/2$ phase difference layer side with respect to the reflection layer is greater than or equal to 0.5 mm, the double image can become considerable, in a case where the distance is greater than or equal to 1 mm, the double image can become more considerable, in a case where the distance is greater than or equal to 1.5 mm, the double image becomes more considerable, and in a case where the distance is greater than or equal to 2.0 mm, the double image becomes particularly considerable. Examples of a layer on a visible side from the reflection layer include a substrate such as a support, an intermediate film sheet, and a second glass plate, in addition to the $\lambda/2$ phase difference layer.

However, in the member for displaying a projected image of the present invention in a projected image display using p-polarized light as described below, even in a case where the total thickness of the layer on the visible side from the reflection layer is in the range described above, a projected image become visible without a considerable double image.

[Combiner]

The member for displaying a projected image of the present invention can be used as a combiner of a head up display system. In the head up display system, the combiner indicates an optical member which can display an image projected from a projector to be visible, and can simultaneously observe information or scenery on a surface on an opposite side when the combiner is observed from a surface on the same side on which the image is displayed. That is, the combiner has a function as an optical path combiner which superimposes external light and video light to be displayed. From a different viewpoint, the combiner has a function as a half mirror which combines an image formed of reflection light and an image formed of transmission light to be displayed.

[Wind Shield Glass]

The member for displaying a projected image of the present invention may be wind shield glass. In other words, at least a part of the wind shield glass may have a configuration in which a projected image can be displayed. At least a part of the wind shield glass may have a function as the combiner described above. In this specification, the wind shield glass indicates window glass of a general conveyance such as a vehicle, for example, a car, an electric train, and the like, an airplane, a ship, and play equipment. It is preferable that the wind shield glass is front glass of a conveyance in a travelling direction. It is preferable that the wind shield glass is front glass of a conveyance.

The wind shield glass may be in the shape of a flat surface. The wind shield glass may be molded to be embedded in a conveyance to be applied, and for example, may have a curved surface. In the wind shield glass molded to be embedded in a conveyance to be applied, in general, a direction which becomes an upper side (a vertical upper side) or a surface which becomes the observer side at the time of being uses can be specified. The wind shield glass may be configured such that the $\lambda/2$ phase difference layer and the reflection layer are disposed in this order from a side which becomes the observer side (in general, the inside of the conveyance) at the time of being used in the conveyance.

The λ/2 phase difference layer and the reflection layer may be disposed on an outer surface of a glass plate of the wind shield glass as a reflection film (a half mirror film), and as described below, may be disposed on an interlayer of wind shield glass having a configuration of laminated glass. In a case of being disposed on the outer surface of the glass plate of the wind shield glass, the reflection film described above may be disposed on the observer side from the glass plate, or may be disposed on the opposite side thereof, but it is preferable that the reflection film is disposed on the observer side. It is particularly preferable that the reflection film described above is disposed on the interlayer of the laminated glass.

The reflection layer and the λ/2 phase difference layer may become the reflection film by being respectively prepared and by adhering to each other, the λ/2 phase difference layer may be formed on the reflection layer (the cholesteric liquid crystal layer), or the reflection layer (the cholesteric liquid crystal layer) may be formed on the λ/2 phase difference layer.

The reflection film may include a layer such as a second phase difference layer, an alignment layer, a support, and an adhesive layer, in addition to the reflection layer and the λ/2 phase difference layer.

(Laminated Glass)

It is preferable that the wind shield glass has a configuration of laminated glass. That is, it is preferable that the wind shield glass has a structure in which two glass plates adhere to each other through an interlayer. In this specification, in the wind shield glass, a glass plate in a position separated from the observer side will be referred to as a first glass plate, and a glass plate in a position close to the observer side will be referred to as a second glass plate.

A glass plate which is usually used in the wind shield glass can be used as the glass plate. The thickness of the glass plate is not particularly limited, but may be approximately 0.5 mm to 5 mm, is preferably 1 mm to 3 mm, and is more preferably 2.0 to 2.3 mm.

The wind shield glass having the configuration of the laminated glass can be manufactured by using a known preparation method of laminated glass. In general, the wind shield glass having the configuration of the laminated glass can be manufactured by a method in which an intermediate film sheet for laminated glass is sandwiched between two glass plates, and then, a heating treatment and a pressurizing treatment (a treatment using a rubber roller, or the like) are repeated several times, and finally, a heating treatment is performed under pressurizing conditions by using an autoclave or the like.

The wind shield glass having the configuration of the laminated glass in which the reflection film including the reflection layer and the λ/2 phase difference layer described above is included in the interlayer may be formed through a general laminated glass preparation step after forming the reflection film on the front surface of the glass plate, or may be formed by performing the heating treatment and the pressurizing treatment described above by using a laminated intermediate film sheet for laminated glass including the reflection film described above as the intermediate film sheet. In a case where the reflection film is formed on the front surface of the glass plate, the glass plate on which the reflection film is formed may be the first glass plate, or may be the second glass plate. At this time, the reflection film, for example, may be bonded to the glass plate by an adhesive.

(Intermediate Film Sheet)

In a case of using an intermediate film sheet not including the reflection film described above, any known intermediate film sheet may be used as the intermediate film sheet. For example, it is possible to use a resin film containing a resin selected from the group consisting of polyvinyl butyral (PVB), an ethylene-vinyl acetate copolymer, and a nitrogen-containing resin. It is preferable that the resin described above is a main component of the intermediate film sheet. Furthermore, the main component indicates a component accounts for a proportion of greater than or equal to 50 mass % of the intermediate film sheet.

In the resins described above, the polyvinyl butyral or the ethylene-vinyl acetate copolymer is preferable, and the polyvinyl butyral is more preferable. It is preferable that the resin is a synthetic resin.

The polyvinyl butyral can be obtained by acetalizing polyvinyl alcohol by butyl aldehyde. In a degree of acetalization of the polyvinyl butyral described above, a preferred lower limit is 40% and a preferred upper limit is 85%, and a more preferred lower limit is 60% and a more preferred upper limit is 75%.

In general, in the polyvinyl alcohol, polyvinyl alcohol which is obtained by saponifying polyvinyl acetate and has a degree of saponification of 80 to 99.8 mol % is generally used.

In addition, in a degree of polymerization of the polyvinyl alcohol described above, a preferred lower limit is 200 and is a preferred upper limit is 3,000. In a case where the degree of polymerization of the polyvinyl alcohol is greater than 200, penetration resistance of laminated glass to be obtained rarely decreases, and in a case where the degree of polymerization of the polyvinyl alcohol is less than or equal to 3,000, moldability of a resin film is excellent, stiffness of the resin film does not excessively increase, and workability is excellent. A more preferred lower limit is 500 and a more preferred upper limit is 2,000.

(Intermediate Film Sheet Including Reflection Layer and λ/2 Phase Difference Layer)

The laminated intermediate film sheet for laminated glass including the reflection layer and the λ/2 phase difference layer can be formed by bonding the reflection film described above to a front surface of the intermediate film sheet described above. Alternatively, the laminated intermediate film sheet for laminated glass can be formed by sandwiching the reflection film described above between two intermediate film sheets described above. Two intermediate film sheets may be identical to each other, or may be different from each other, and it is preferable that the two intermediate film sheets are identical to each other.

In order to bond the reflection film onto the intermediate film sheet, a known bonding method can be used, and it is preferable to use a lamination treatment. In a case where the lamination treatment is performed such that a laminate and the intermediate film sheet are not peeled off after being processed, it is preferable that the lamination treatment is performed under a certain degree of heating and pressurizing conditions.

In order to stably perform lamination, a film surface temperature of the intermediate film sheet on an adhesion side is preferably 50° C. to 130° C., and is more preferably 70° C. to 100° C.

It is preferable that pressurization is performed at the time of performing the lamination. Pressurizing conditions are preferably less than 2.0 kg/cm$^2$, are more preferably in a range of 0.5 to 1.8 kg/cm$^2$, and are even more preferably in a range of 0.5 to 1.5 kg/cm$^2$.

In addition, in the reflection film including the support, the support may be peeled off simultaneously with, immediately after, or immediately before the lamination. That is, the laminated intermediate film sheet obtained after the lamination may not include the support.

An example of a manufacturing method of the laminated intermediate film sheet for laminated glass, includes:

(1) a first step of obtaining a first laminate by bonding the reflection film onto a front surface of a first intermediate film sheet, and (2) a second step of bonding a second intermediate film sheet onto a surface of the reflection film on a side opposite to the surface onto which the first intermediate film sheet is bonded in the first lamination.

The manufacturing method is a manufacturing method of a laminated intermediate film sheet for laminated glass in which on the first step, the reflection film is bonded onto the first intermediate film sheet, the support is peeled off, and in the second step, the second intermediate film sheet is bonded onto the surface from which the support is peeled off.

By this method, it is possible to manufacture a laminated intermediate film sheet for laminated glass not including a support, and it is possible to easily prepare laminated glass not including a support by using the laminated intermediate film sheet for laminated glass. In order to stably peel off the support without a breakage or the like, the temperature of the substrate at the time of peeling off the support from the reflection film is preferably higher than or equal to 40° C., and is more preferably 40° C. to 60° C.

(Position of Portion Having Combiner Function)

In the wind shield glass, a portion having a combiner function, for example, the reflection film including the reflection layer and the $\lambda/2$ phase difference layer may be disposed in any position, and it is preferable that the reflection film is disposed such that a virtual image is shown in a position in which the virtual image is easily viewed from an observer (for example, a driver) at the time of being used as a head up display system. For example, a disposing position of the portion having a combiner function may be determined from a relationship between a position of a driver seat of a conveyance to be applied and a position on which a projector is disposed.

<Projected Image Display System>

The member for displaying a projected image can be used for displaying a projected image by using in combination with means exiting projection light, such as a projector. That is, the member for displaying a projected image of the present invention can be used as a configuration member of a projected image display system. The projected image display system, for example, may be a projected image display device, may be an integration of the member for displaying a projected image and the means exiting the projection light, or may be a combination of the member for displaying a projected image and the means exiting the projection light.

In this specification, a projected image does not indicate the surrounding scenery, but indicates a video based on light projection from a projector to be used. The projected image may be a video having a single color, or may be a video having a multicolor or a full color. The projected image may be formed by reflection light of the member for displaying a projected image. In a case where the member for displaying a projected image includes the portion having a combiner function, the projected image may be observed as a virtual image which is viewed as floating on the portion having a combiner function of the member for displaying a projected image as seen from the observer.

It is preferable that the projection light (an incidence ray) at the time of displaying the projected image is p-polarized light which vibrates in a direction parallel to the incidence surface. The incidence ray may be incident from the $\lambda/2$ phase difference layer side with respect to the reflection layer, and may be incident on the reflection layer through the $\lambda/2$ phase difference layer. That is, a phase difference layer may be disposed on the incidence ray side with respect to the reflection layer. In addition, it is preferable that the incidence ray is incident at a tilt incidence angle of 45° to 70° with respect to the normal line of the member for displaying a projected image. A BREWSTER angle on the interface between glass having a refractive index of approximately 1.51 and air having a refractive index of 1 is approximately 56°, and the p-polarized light is incident in the angle range described above, and thus, reflection light of the incidence ray for displaying the projected image from the front surface of the $\lambda/2$ phase difference layer with respect to reflection layer decreases, and an image which is less affected by a double image can be displayed. It is preferable that the angle described above is 50° to 65°. At this time, a configuration may be used in which the projected image can be observed on a side opposite to the incidence ray with respect to the normal line of the $\lambda/2$ phase difference layer at an angle of 45° to 70°, and preferably at an angle of 50° to 65°, on an incidence ray flat surface side.

The incidence ray may be incident from any direction such as up-and-down and right-and-left directions of the member for displaying a projected image, and the direction may be determined according to the direction of the observer. For example, the incidence ray may be incident at a tilt incidence angle from a lower side at the time of being used as described above.

In addition, the slow axis of the $\lambda/2$ phase difference layer in the member for displaying a projected image has an angle of 40° to 65°, and preferably an angle of 45° to 60°, with respect to a vibration direction (the incidence surface of the incidence ray) of the incidence p-polarized light.

[Head Up Display System]

Preferred examples of the projected image display system can include a head up display system.

The head up display system using the wind shield glass as the member for displaying a projected image can be referred to JP1990-141720A (JP-H02-141720A), JP1998-96874A (JP-H10-96874A), JP2003-98470A, U.S. Pat. No. 5,013,134A, JP2006-512622A, and the like.

[Projector]

In this specification, the "projector" is a "device projecting light or an image", and includes a "device projecting a drawn image". In the head up display system, it is preferable that the projector includes a drawing device, and reflects and displays an image (a real image) drawn on a small intermediate image screen as a virtual image by using a combiner.

The drawing device of the projector is not particularly limited as the drawing device has a function of projecting an image. Examples of the projector include a liquid crystal projector, a digital light processing (DLP) projector using a digital micromirror device (DMD), a grating light valve (GLV) projector, a liquid crystal on silicon (LCOS) projector, a CRT projector, and the like. The DLP projector and the grating light valve (GLV) projector may use microelectromechanical systems (MEMS).

A laser light source, an LED, a discharge tube, and the like can be used as a light source of the projector. The projector may include reflecting mirror or the like which adjusts an optical path projection light formed in the drawing device.

As described above, it is preferable that the p-polarized light is incident on the member for displaying a projected image, and thus, the projected image is formed. In a case where exit light of the projector is not linearly polarized light, a linearly polarizing film may be used by being disposed on the projector on an exit light side, or the exit light may be subjected to linear polarization in an optical path from the projector to the member for displaying a projected image.

In particular, the member for displaying a projected image of the present invention is useful in the head up display system which is used in combination with the projector using laser of which a light emission wavelength is not continuous in a visible light range, an LED, an OLED, and the like in a light source. The center wavelength of the selective reflection of the cholesteric liquid crystal layer can be adjusted according to each light emission wavelength. In addition, a liquid crystal display device (LCD), an OLED, and the like can be used for projecting a display of which display light is polarized.

EXAMPLES

Hereinafter, the present invention will be described in more detail with reference to examples. Materials, reagents, substance quantities and ratios thereof, operations, and the like described in the following examples can be suitably changed insofar as the change is departed from the gist of the present invention. Accordingly, the range of the present invention is not limited to the following examples.

<Preparation of Liquid Crystal Layer BR>

A rubbing treatment was performed with respect to onto a surface of COSMOSHINE A-4100 (PET, a thickness of 75 μm) manufactured by TOYOBO CO., LTD. to which an easily adhesive treatment had not been performed, and a coating liquid 1 shown in Table 1 was applied onto the surface at a room temperature by using a wire bar such that a thickness of a dried film after being dried became 3.4 μm. Furthermore, in coating liquids 1 to 7 shown in Table 1, methyl ethyl ketone (MEK) was used as a solvent, and the amount of solvent was adjusted such that a concentration of solid contents became 35 mass %. A coated layer was dried at a room temperature for 30 seconds, and then, was heated at an atmosphere of 85° C. for 2 minutes, and after that, was subjected to UV irradiation at a temperature of 80° C. and an output of 60% for 6 to 12 seconds by a D bulb (a lamp of 90 mW/cm) manufactured by Fusion UV Systems, Inc., and thus, a liquid crystal layer BR was obtained on a PET base.

<Preparation of Liquid Crystal Layers GR, RR, BL, GL, and RL>

Liquid crystal layers GR, RR, BL, GL, and RL were respectively prepared on a PET base in the same procedure as that of the preparation of the liquid crystal layer BR except that each of coating liquids 2 to 6 (a solvent was MEK) shown in Table 1 was used instead of the coating liquid 1, and the coating was performed at a room temperature by using a wire bar such that a thickness of a dried film after being dried became a thickness shown in Table 2.

<Preparation of Phase Difference Layer RE-1>

A rubbing treatment was performed with respect to a surface of COSMOSHINE A-4300 (PET, a thickness of 75 μm) manufactured by TOYOBO CO., LTD. to which an easily adhesive treatment has not been performed, and a coating liquid 7 shown in Table 1 was applied onto the surface at a room temperature by a wire bar such that a thickness of a dried film after being dried became 1.74 μm. An obtained coated film was dried at a room temperature for 30 seconds, and then, was heated at an atmosphere of 85° C. for 1 minute, and after that, was subjected to UV irradiation at a temperature of 30° C. and an output of 60% for 6 to 12 seconds by using a D bulb (a lamp of 90 mW/cm) manufactured by Fusion UV Systems, Inc., and thus, a liquid crystal layer was prepared, and a phase difference layer RE-1 (a λ/2 phase difference layer) was obtained on a PET base.

<Preparation of Phase Difference Layer RE-2>

A phase difference layer RE-2 (a λ/2 phase difference layer) was prepared on a PET base in the same procedure as that of the preparation of the phase difference layer RE-1 except that the coating was performed at room temperature by using a wire bar such that a thickness of a dried film after being dried became 0.87 μm.

<Preparation of Liquid Crystal Layers nBR, nGR, and nRR>

Liquid crystal layers nBR, nGR, and nRR were respectively prepared on a PET base in the same procedure as that of the preparation of the liquid crystal layer BR except that each of coating liquids 8 to 10 (a solvent was methyl acetate:cyclohexanone=4:1 (a mass ratio)) shown in Table 2 were used instead of the coating liquid 1, and the coating was performed at a room temperature by using a wire bar such that a thickness of a dried film after being dried became a thickness shown in Table 3.

<Preparation of Phase Difference Layer RE-3>

A phase difference layer RE-3 (a second phase difference layer) was prepared on a PET base by the same method as that of RE-1 except that the coating was performed such that a thickness of a dried film became 2.4 μm.

In Table 3, a thickness of each of the liquid crystal layers, a selective reflection center wavelength of vertical incidence with respect to a surface on the liquid crystal layer side and a selective reflection center wavelength of an incidence ray tilted at 60 degrees from the vertical incidence, and a sense of circular polarization of reflection light are shown. The center wavelength was measured by using a spectrophotometer V-670 manufactured by JASCO Corporation, and the sense of the circular polarization of the reflection light was determined by disposing a circularly polarizing plate in which a sense of circularly polarized light to be selectively reflected was known on the spectrophotometer on a light receiving side, and by measuring a reflection light intensity.

In Table 4, a film thickness of the phase difference layer (the λ/2 phase difference layer and the second phase difference layer), and a phase difference with respect to light at a wavelength of 550 nm were shown. The phase difference was measured with respect to a sample in which the surface of the phase difference layer on the PET was bonded onto a pressure sensitive adhesive sheet on a glass plate, and then, the PET base was peeled off, and the phase difference layer was transferred onto the glass plate, by using AXOSCAN manufactured by AXOMETRICS, Inc.

TABLE 1

| | | Coating Liquid 1 | Coating Liquid 2 | Coating Liquid 3 | Coating Liquid 4 | Coating Liquid 5 | Coating Liquid 6 | Coating Liquid 7 |
|---|---|---|---|---|---|---|---|---|
| Liquid Crystal Compound | Compound 1 | 80 | 80 | 80 | 80 | 80 | 80 | 80 |
| Liquid Crystal Compound | Compound 2 | 20 | 20 | 20 | 20 | 20 | 20 | 20 |
| Polymerization Initiator | Irg-819 (manufactured by BASF SE) | 4 | 4 | 4 | 4 | 4 | 4 | 4 |
| Alignment Control Agent | Compound 3 | 0.07 | 0.07 | 0.07 | 0.07 | 0.07 | 0.07 | 0.07 |
| Alignment Control Agent | Compound 4 | 0.03 | 0.03 | 0.03 | 0.03 | 0.03 | 0.03 | 0.03 |
| Chiral Agent | PALIOCOLOR LC-756 (manufactured by BASF SE) | 5.6 | 4.7 | 4 | 0 | 0 | 0 | 0 |
| Chiral Agent | Compound 5 | 0 | 0 | 0 | 9.1 | 7.7 | 6.5 | 0 |

Unit of Numerical Value in Table is Parts by Mass

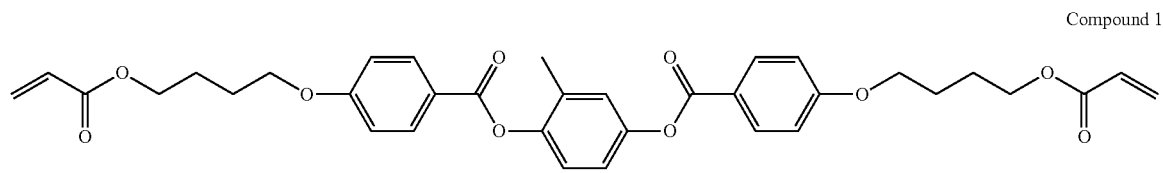

Compound 1

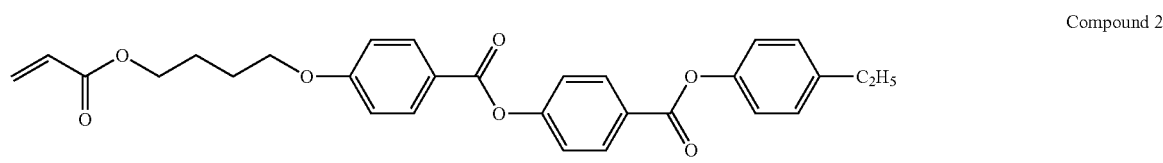

Compound 2

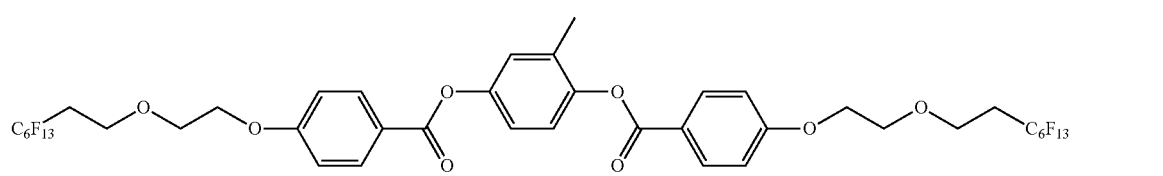

Compound 3

Compound 4

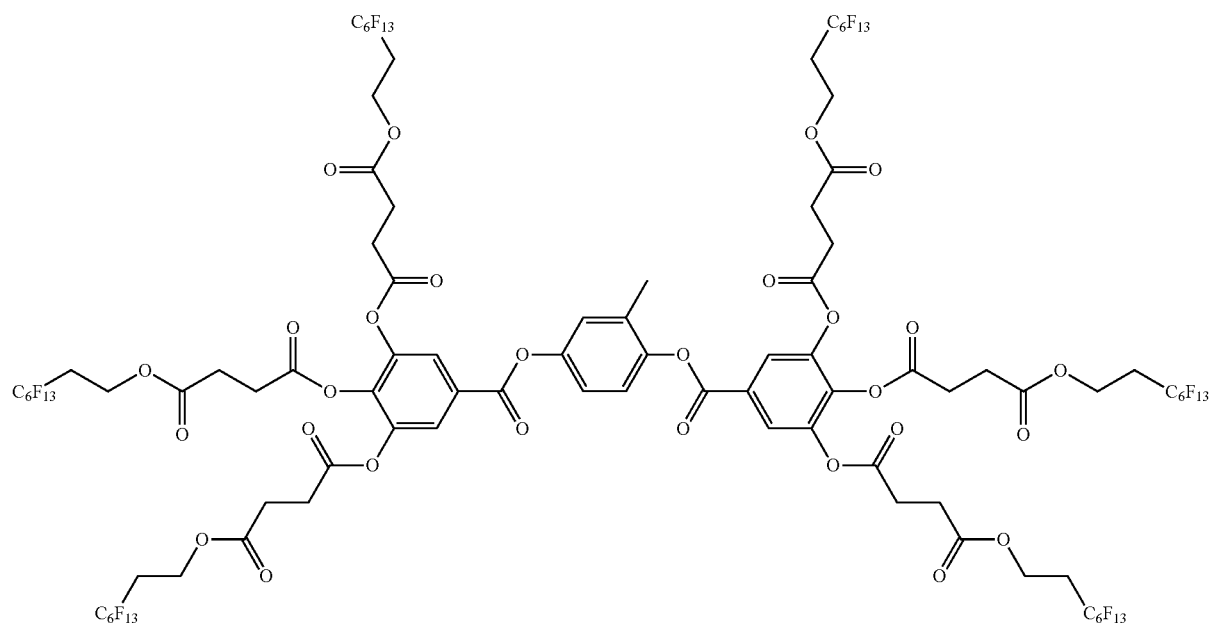

Compound 5

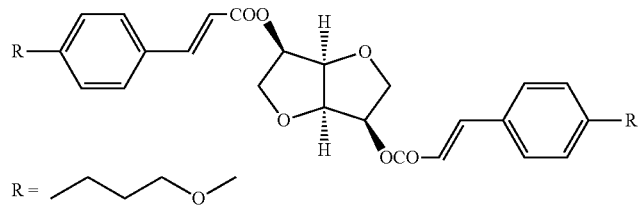

| Formulation of Coating Liquid | | Coating Liquid 8 (Low Δn BR) nBR | Coating Liquid 9 (Low Δn GR) nGR | Coating Liquid 10 (Low Δn RR) nRR |
|---|---|---|---|---|
| Liquid Crystal Compound | Compound 1-3 | 55 | 55 | 55 |
| Liquid Crystal Compound | Compound 2-3 | 30 | 30 | 30 |
| Liquid Crystal Compound | Compound 1 | 13 | 13 | 13 |
| Liquid Crystal Compound | Compound (M-2) | 2 | 2 | 2 |
| Polymerization Initiator | Irg-819 | 3 | 3 | 3 |
| Alignment Control Agent | Compound 3 | 0.01 | 0.01 | 0.01 |
| Alignment Control Agent | Alignment Agent (2) | 0.002 | 0.002 | 0.002 |
| Chiral Agent | PALIOCOLOR LC-756 | 4.8 | 4.1 | 3.3 |

Unit in Table is Parts by Mass

Compound (M-2)

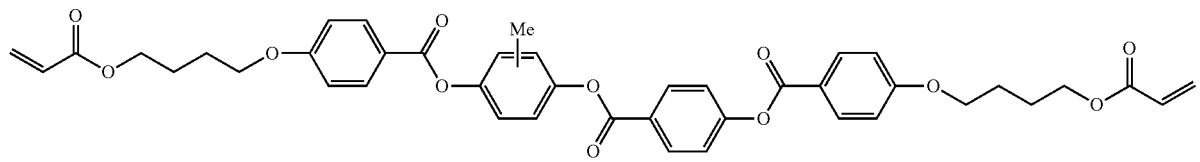

Alignment Agent (2)

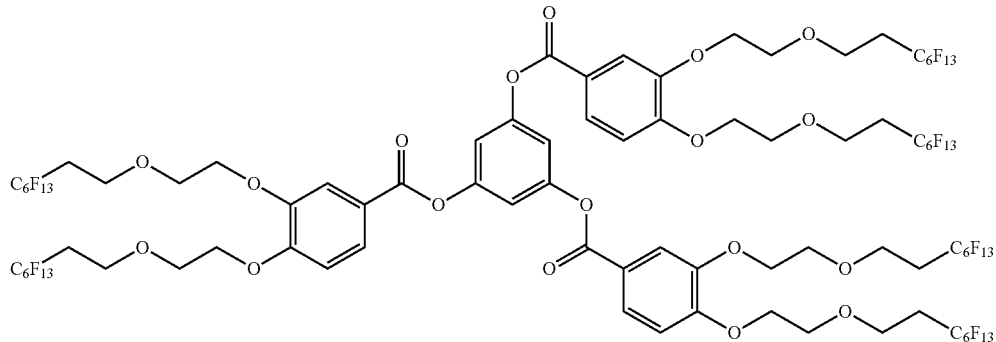

In Table 2, a compound 1-3 and a compound 2-3 were synthesized by the following procedure.

(Synthesis of Compound 1-3)

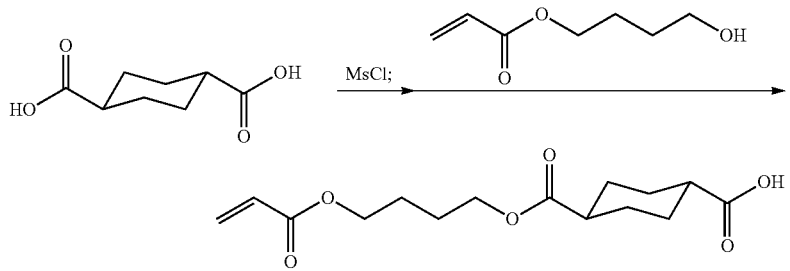

Carboxylic Acid A

A trans-1,4-cyclohexane dicarboxylic acid (10 g), mesyl chloride (1.9 mL), and dibutyl hydroxy toluene (BHT) (0.2 g) were stirred in tetrahydrofurane (THF) (72 mL), and triethyl amine (3.7 mL) was subjected to dropwise addition by retaining an internal temperature to be lower than or equal to 25° C. Stirring was performed at a room temperature for 2 hours, and then, N,N-dimethyl aminopyridine (0.3 g) and 4-hydroxy butyl acrylate (3.1 g) were added, and triethyl amine (3.7 mL) was subjected to dropwise addition at an internal temperature of lower than or equal to 25° C. Stirring was performed at a room temperature for 3 hours, and then, water (0.5 mL) and methanol (2 mL) were added, and a reaction liquid to which ethyl acetate was added was subjected to celite filtration, a water layer was removed by adding a dilute hydrochloric acid to a filtrate, and washing was sequentially performed with sodium bicarbonate water and saline. An organic layer was dried with magnesium sulfate, a desiccant was filtered, and then, a solvent was distilled under reduced pressure, and thus, a carboxylic acid A (7.1 g) was obtained.

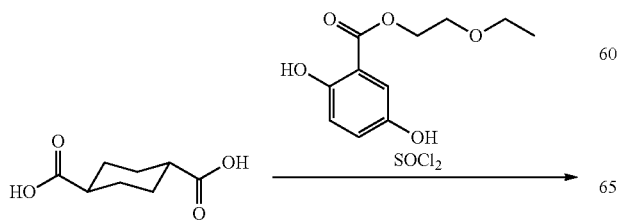

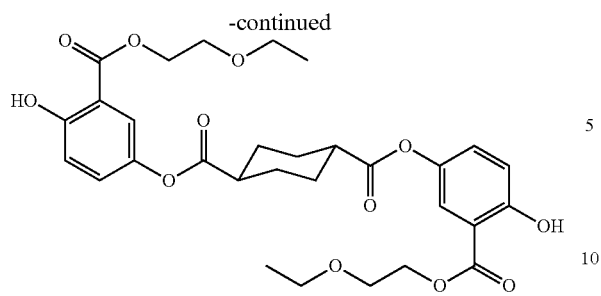

Phenol Derivative B

A mixture of a trans-1,4-cyclohexane dicarboxylic acid (5 g), toluene (40 mL), and N,N-dimethyl formamide (0.05 mL) was heated and stirred, thionyl chloride (8.3 g) was subjected to dropwise addition at an internal temperature of 80° C., and then, heating and stirring were performed at an internal temperature 80° C. for 2 hours. Cooling was performed to an internal temperature of 30° C., and then, 2-ethoxy ethyl-2,5-dihydroxy benzoate (13.1 g) was added, and then, heating and stirring were performed at an internal temperature of 90° C. for 4 hours. Methanol (60 mL) was added at an internal temperature of 40° C., and then, stirring was further performed at an internal temperature 5° C. for 30 minutes, and generated crystals were filtered, and thus, 11.5 g of a phenol derivative B was obtained.

$^1$H-NMR (Solvent: CDCl$_3$) δ (ppm):
1.25 (t, 6H), 1.6-1.7 (m, 4H), 2.2-2.4 (m, 4H), 2.5-2.6 (m, 2H), 3.55-3.65 (m, 4H), 3.8-3.85 (m, 4H), 4.45-4.5 (m, 4H), 7.0 (d, 2H), 7.2 (dd, 2H), 7.6 (d, 2H)

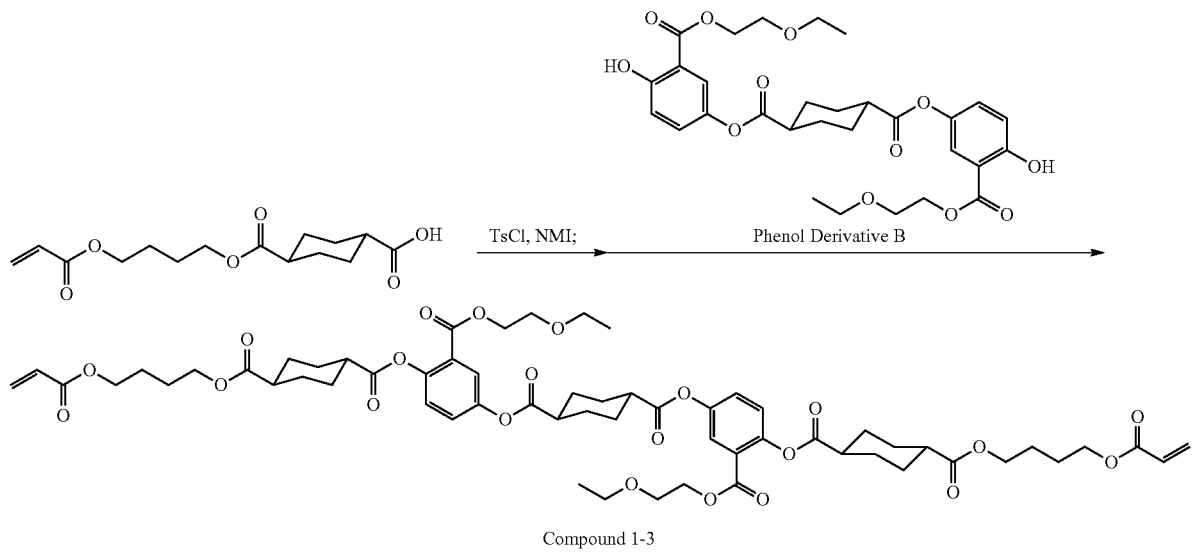

Compound 1-3

The carboxylic acid A (13.4 g), TsCl (10.3 g), and BHT (0.2 g) were stirred in THF (40 mL) and 1-ethyl-2-pyrrolidone (25 mL), 1-methyl imidazole (11 mL) was subjected to dropwise addition under ice cooling, and stirring was performed at a room temperature for 1 hour. The phenol derivative B (10.6 g) was added, and stirring was further performed at a room temperature for 2 hours. Water (10 mL) was added, and then, a water layer was removed, water and methanol were added, stirring was performed for 1 hour under ice cooling, and generated crystals were filtered, and thus, a compound 1-3 (18.3 g) was obtained.

¹H-NMR (Solvent: CDCl₃) δ (ppm):
1.2 (t, 6H), 1.4-1.8 (m, 18H), 2.1-2.2 (m, 411), 2.2-2.4 (m, 12H), 2.5-2.7 (m, 4H), 3.5 (q, 4H), 3.7-3.8 (m, 4H), 4.1-4.3 (m, 8H), 4.4-4.5 (m, 4H), 5.8 (dd, 2H), 6.1 (dd, 2H), 6.4 (dd, 2H), 7.1 (d, 2H), 7.3 (dd, 2H), 7.7 (d, 2H)

(Synthesis of Compound 2-3)

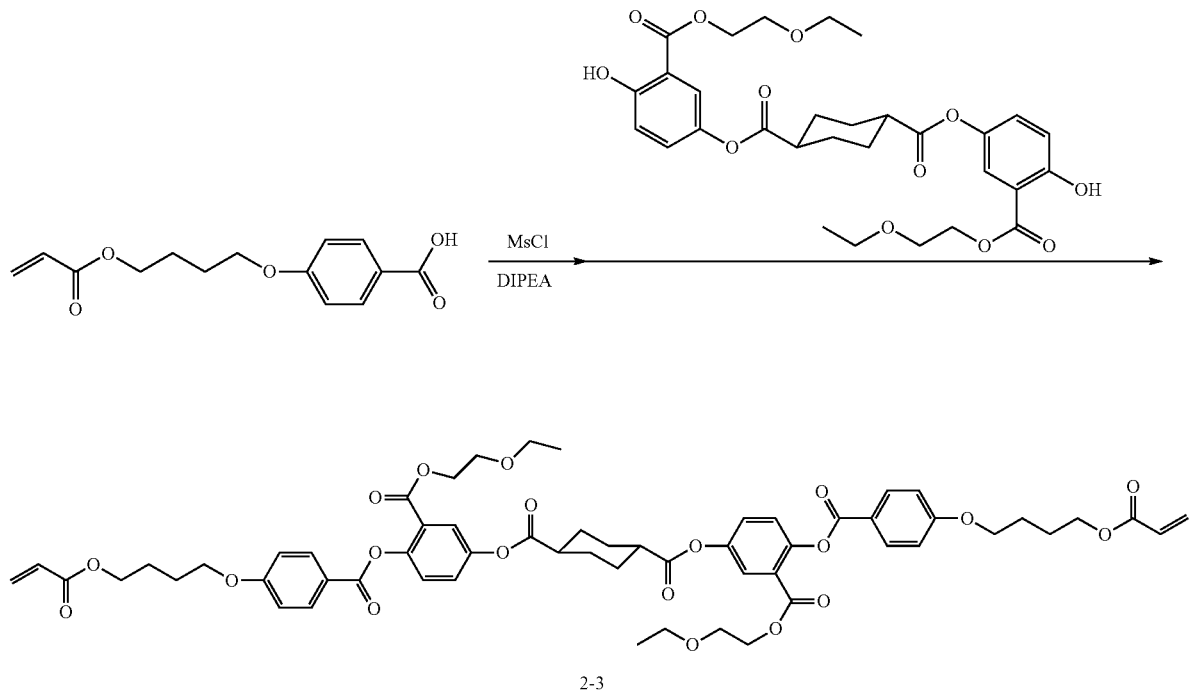

2-3

A 4-(4-acryloyloxy butyloxy) benzoic acid was synthesized with reference to a method described in [0085] to [0087] on Page 18 of JP4397550B.

BHT (60 mg) was added to a solution of tetrahydrofuran (10 mL) of methane sulfonyl chloride (1.62 mL), and an internal temperature was cooled to −5° C. A solution of 4-(4-acryloyloxy butyloxy) benzoic acid (5.5 g) and tetrahydrofuran (8 mL) of diisopropyl ethyl amine (3.7 mL), which was separately prepared, was subjected to dropwise addition such that an internal temperature did not become higher than or equal to 0° C. Stirring was performed at −5° C. for 1 hour, and then, a small amount of N-methyl imidazole was added, the phenol derivative B (5.2 g) was added, and 5 mL of tetrahydrofuran was added, and then, triethyl amine (3.1 mL) was subjected to dropwise addition, and after that, stirring was performed at a room temperature for 3 hours. The reaction was stopped by adding water (13 mL), a water layer was removed by adding ethyl acetate, and washing was sequentially performed with a dilute hydrochloric acid and saline. Filtration was performed by adding a desiccant, and then, generated crystals were filtered by adding methanol (15 mL), and thus, 8.5 g of a compound 2-3 was obtained.

¹H-NMR (Solvent: CDCl₃) δ (ppm):
1.2 (t, 6H), 1.65-1.8 (m, 4H), 1.85-1.95 (m, 8H), 2.3-2.4 (m, 4H), 2.6-2.7 (m, 2H), 3.4 (q, 4H), 3.5-3.6 (m, 4H), 4.1 (m, 4H), 4.15-4.25 (m, 8H), 5.85 (dd, 2H), 6.1 (dd, 2H), 6.4 (dd, 2H), 7.0 (d, 41), 7.25 (d, 2H), 7.35 (dd, 2H), 7.8 (d, 2H), 8.15 (d, 4H)

TABLE 3

Film Thickness of Reflection Layer and Optical Properties of Selective Reflection Light

| | Reflection Layer Name | | | | | | | | |
|---|---|---|---|---|---|---|---|---|---|
| | BR | GR | RR | BL | GL | RL | nBR | nGR | nRR |
| Thickness of Layer | 3.4 μm | 4.1 μm | 4.9 μm | 3.4 μm | 4.1 μm | 4.9 μm | 4.9 μm | 5.8 μm | 7.2 μm |
| Selective Reflection Center Wavelength (Vertical Incidence) | 540 nm | 641 nm | 761 nm | 540 nm | 641 nm | 761 nm | 548 nm | 648 nm | 770 nm |
| Reflection Center Wavelength (60 Degrees) | 450 nm | 535 nm | 635 nm | 450 nm | 535 nm | 635 nm | 450 nm | 535 nm | 635 nm |
| Sense of Reflection Circular Polarization | Right | Right | Right | Left | Left | Left | Right | Right | Right |

TABLE 4

Optical Properties of Phase Difference Layer

| | Phase Difference Layer Name | | |
|---|---|---|---|
| | RE-1 | RE-2 | RE-3 |
| Thickness of Layer | 1.74 μm | 0.87 μm | 2.40 μm |
| Front Phase Difference/550 nm | 276 nm | 137 nm | 380 nm |

<Preparation of Optical Functional Layers HM-1 to HM-4>

The prepared reflection layers BR, GR, RR, BL, GL, and RL and the prepared phase difference layers RE-1 and RE-2 were bonded to each other according to a combination and a lamination order shown in Table 5, and thus, optical functional layers HM-1 to HM-4 were prepared. The reflection layers prepared as described above were bonded to each other or the reflection layers and the phase difference layers were bonded to each other by the following procedure.

A UV curable adhesive Exp. U12034-6 manufactured by DIC CORPORATION was applied onto a front surface of the reflection layer 3 on the liquid crystal layer side which was a lowermost layer shown in Table 5 at a room temperature by using a wire bar such that a thickness of a dried film after being dried became 5 μm. A coated surface and the surface of the reflection film on the liquid crystal layer side which was an upper layer shown in Table 5 were bonded to each other such that air bubbles were not contained, and were subjected to UV irradiation at a temperature of 30° C. and an output of 60% for 12 seconds by a D bulb (a lamp of 90 mW/cm) manufactured by Fusion UV Systems, Inc. After that, a PET film which became a support of the upper layer was peeled off. This procedure was repeated, and thus, optical functional layers HM-1 to HM-4 were prepared.

<Preparation of Optical Functional Layer HM-5>

A coating liquid 8 shown in Table 2 was applied onto the phase difference layer RE-1 on the PET base which was prepared as described above at a room temperature by using a wire bar such that a thickness of a dried film after being dried became 4.9 μm. Furthermore, in coating liquids 8 to 10 shown in Table 2, a mixed solvent of methyl acetate:cyclohexanone=4:1 (a mass ratio) was used as a solvent, and the amount of solvent was adjusted such that a concentration of solid contents became 35 mass %. A coated layer was dried at a room temperature for 30 seconds, and then, was heated at an atmosphere of 100° C. for 2 minutes, and after that, was subjected to UV irradiation at a temperature of 60° C. and an output of 60% for 6 to 12 seconds by using a D bulb (a lamp of 90 mW/cm) manufactured by Fusion UV Systems, Inc., and thus, a liquid crystal layer was immobilized.

Further, a coating liquid 9 shown in Table 2 was applied thereon at a room temperature by using a wire bar such that a thickness of a dried film after being dried became 5.8 μm, and alignment of a liquid crystal layer was immobilized in the same conditions as those of the coating liquid 8. Finally, a coating liquid 10 shown in Table 2 was applied thereon at a room temperature by using a wire bar such that a thickness of a dried film after being dried became 7.2 μm, and alignment of a liquid crystal layer was immobilized in the same conditions as those of the coating liquid 8, and thus, an optical functional layer HM-5 in a lamination order shown in Table 5 was obtained.

<Preparation of Optical Functional Layer HM-6>

A UV curable adhesive Exp. U12034-6 manufactured by DIC CORPORATION was applied onto the phase difference layer RE-3 on the PET which was prepared as described above at a room temperature by using a wire bar such that a thickness of a dried film after being dried became 5 μm. The surface of the optical functional layer HM-5 on the liquid crystal layer side was bonded thereon such that air bubbles were not contained, and was subjected to UV irradiation at a temperature of 30° C. and an output of 60% for 12 seconds by a D bulb (a lamp of 90 mW/cm) manufactured by Fusion UV Systems, Inc. At this time, a direction was adjusted such that an intersection angle between slow axes of RE-1 and RE-3 became 35 degrees. After that, a PET film which became a support of RE-3 was peeled off, and thus, an optical functional layer HM-6 in a lamination order shown in Table 5 was obtained.

TABLE 5

Configuration of Optical Functional Layer

| | HM-1 | HM-2 | HM-3 | HM-4 | HM-5 | HM-6 |
|---|---|---|---|---|---|---|
| λ/2 Phase Difference Layer | RE-1 | RE-1 | None | RE-2 | RE-1 | RE-1 |

TABLE 5-continued

| | HM-1 | HM-2 | HM-3 | HM-4 | HM-5 | HM-6 |
|---|---|---|---|---|---|---|
| Reflection Layer 1 | BR | BL | BR | BR | nBR | nBR |
| Reflection Layer 2 | GR | GL | GR | GR | nGR | nGR |
| Reflection Layer 3 | RR | RL | RR | RR | nRR | nRR |
| Second Phase Difference Layer | None | None | None | None | None | RE-3 |

Examples 1 to 4 and Comparative Examples 1 to 4

Preparation of Wind Shield Glass of Example 1

Polyvinyl butyral (PVB) having a thickness of 0.38 mm manufactured by SEKISUI CHEMICAL CO., LTD. which was cut into the same shape as that of a glass plate having a length of 40 cm, a width of 25 cm, and a thickness of 2 mm was disposed on the glass plate, the phase difference layer of the optical functional layer HM-1 which was prepared as described above was superimposed thereon to be on the PVB side, and then, the optical functional layer adhered to the PVB by using a roller. Next, the PET base on an uppermost surface of the optical functional layer was peeled off, and the cut PVB was disposed thereon, and a glass plate having a length of 40 cm, a width of 25 cm, and a thickness of 3 mm was disposed thereon. At this time, a slow axis direction of the phase difference layer of the optical functional layer HM-1 was disposed to be a direction at 55 degrees in a clockwise direction as seen from the glass side having a thickness of 2 mm, on the basis of a short side direction of the glass.

Next, the laminate was retained at 90° C. and 0.1 atmospheric pressure for 1 hour, and then, was heated at 115° C. and 13 atmospheric pressure for 20 minutes to remove air bubbles, and thus, wind shield glass of Example 1 was obtained.

Preparation of Wind Shield Glass of Example 2 and Comparative Examples 1 to 4

Wind shield glass of Example 2 and Comparative Examples 1 to 4 were prepared by the same method as that of the wind shield glass of Example 1 except that the optical functional layer HM-1 was changed to any one of HM-2 to HM-4 as shown in Table 6 or was not used, and was formed such that a slow axis azimuthal angle of the phase difference layer had a value shown in Table 6.

Preparation of Wind Shield Glass of Example 3

Polyvinyl butyral (PVB) having a thickness of 0.38 mm manufactured by SEKISUI CHEMICAL CO., LTD. which was cut into the same shape as that of a glass plate having a length of 40 cm, a width of 25 cm, and a thickness of 3 mm was disposed on the glass plate, the liquid crystal layer of the optical functional layer HIM-5 which was prepared as described above was superimposed thereon to be on the PVB side, and then, the optical functional layer adhered to the PVB by using a roller. Next, the PET base on an uppermost surface (on the RE-1 side) of the optical functional layer was peeled off, and the cut PVB was disposed thereon, and a glass plate having a length of 40 cm, a width of 25 cm, and a thickness of 2 mm was disposed thereon. At this time, a slow axis direction of the λ/2 phase difference layer (RE-1) of the optical functional layer HM-5 was disposed to be a direction at 55 degrees in a clockwise direction as seen from the glass side having a thickness of 2 mm, on the basis of a short side direction of the glass.

Next, the laminate was retained at 90° C. and 0.1 atmospheric pressure for 1 hour, and then, was heated at 115° C. and 13 atmospheric pressure for 20 minutes to remove air bubbles, and thus, wind shield glass of Example 3 was obtained.

Preparation of Wind Shield Glass of Example 4

Polyvinyl butyral (PVB) having a thickness of 0.38 mm manufactured by SEKISUI CHEMICAL CO., LTD. which was cut into the same shape as that of a glass plate having a length of 40 cm, a width of 25 cm, and a thickness of 2 mm was disposed on the glass plate, the second phase difference layer (RE-3) of the optical functional layer HM-6 which was prepared as described above was superimposed thereon to be on the PVB side, and then, the optical functional layer adhered to the PVB by using a roller. Next, the PET base on an uppermost surface of the optical functional layer was peeled off, and the cut PVB was disposed thereon, and a glass plate having a length of 40 cm, a width of 25 cm, and a thickness of 3 mm was disposed thereon. At this time, a slow axis direction of the λ/2 phase difference layer (RE-1) of the optical functional layer HM-6 was disposed to be a direction at 55 degrees in a clockwise direction as seen from the glass side having a thickness of 2 mm, on the basis of a short side direction of the glass, and a slow axis direction of a phase difference layer 2 was disposed to be a direction at 20 degrees in the clockwise direction as seen from the glass side having a thickness of 2 mm, on the basis of the short side direction of the glass.

Next, the laminate was retained at 90° C. and 0.1 atmospheric pressure for 1 hour, and then, was heated at 115° C. and 13 atmospheric pressure for 20 minutes to remove air bubbles, and thus, wind shield glass of Example 4 was obtained.

<Evaluation of Optical Performance>

Optical evaluation was performed in arrangement as illustrated in FIG. 1. In FIG. 1, the prepared wind shield glass was tilted such that a long side was horizontally disposed, a short side was vertically disposed, and the glass side having a thickness of 2 mm was disposed on a lower side, and an image was projected onto the glass side. In this arrangement, a vertical direction of an observer is the short side direction of the glass, and an image was projected from the glass side having a thickness of 2 mm, and the image was observed. In a projection image, a liquid crystal panel 23EA53VA having white luminance of 200 cdm$^{-2}$ and a chromaticity of x=0.32 and y=0.32, which was manufactured by LG Electronics Incorporated, was used. The evaluation was performed in a polarization direction of a projection image shown in Table 6. A P wave in Table 6 is linearly polarized light of which an electric field vector vibration surface is parallel to the paper in FIG. 1, and an S wave is linearly polarized light of which an electric field vector vibration surface is vertical to the paper.

The luminance and the chromaticity were measured by displaying a white solid image on the liquid crystal panel and by using a luminance meter BM-5A manufactured by TOPCON CORPORATION. At this time, in order to eliminate polarization dependency, the luminance and the chromaticity were measured by rotating the luminance meter by 0 degrees and 90 degrees rotation by using measurement light as a rotation axis, and the measured luminance and the chromaticity were averaged.

In evaluation of a double image, visibility of characters was visually evaluated by displaying white characters on black ground on the liquid crystal panel. Evaluation standards were as described below.

A: The characters were readable under an interior illumination and in an interior dark state B: The characters were recognized and readable under the interior illumination, but were difficult to read in the interior dark state (an unacceptable level)

C: The characters were difficult to read under the interior illumination and in the interior dark state In visibility at the time of wearing polarized sunglasses, characters visibility was visually evaluated by displaying white characters on black ground on the liquid crystal panel, and by wearing polarized sunglasses. Evaluation standards were as described below.

A: The characters were readable under the interior illumination and in the interior dark state B: The characters were recognized and readable under the interior illumination, but were difficult to read in the interior dark state (an unacceptable level)

C: The characters were difficult to read under the interior illumination and in the interior dark state The evaluation results are shown in Table 6.

TABLE 6

| | Optical Functional Layer | Slow Axis Azimuthal Angle of $\lambda/2$ Phase Difference Layer | Slow Axis Azimuthal Angle of Second Phase Difference Layer | Polarization State of Image | Luminance/ cdm$^{-2}$ | Chromaticity x | Chromaticity y | Double Image | Visibility of Polarized Sunglasses | Transmittance |
|---|---|---|---|---|---|---|---|---|---|---|
| Example 1 | HM-1 | +55 Degrees | — | P Wave | 148 | 0.3 | 0.31 | A | A | 66% |
| Example 2 | HM-2 | −55 Degrees | — | P Wave | 148 | 0.3 | 0.31 | A | A | 66% |
| Comparative Example 1 | HM-3 | — | — | P Wave | 47 | 0.28 | 0.27 | A | B | 66% |
| Comparative Example 2 | HM-4 | +45 Degrees | — | P Wave | 85 | 0.39 | 0.39 | B | A | 66% |
| Comparative Example 3 | HM-4 | −45 Degrees | — | P Wave | 70 | 0.21 | 0.23 | B | A | 66% |
| Comparative Example 4 | None | — | — | S Wave | 33 | 0.32 | 0.32 | C | C | 66% |
| Example 3 | HM-5 | +55 Degrees | — | P Wave | 118 | 0.3 | 0.31 | B | A | 74% |
| Example 4 | HM-6 | +55 Degrees | +20 Degrees | P Wave | 117 | 0.3 | 0.31 | A | A | 76% |

EXPLANATION OF REFERENCES

1: wind shield glass
2: liquid crystal panel
3: luminance meter

What is claimed is:

1. A projected image display system comprising a member for displaying a projected image, said member comprising:
a first glass plate;
a second glass plate; and
an interlayer between the first glass plate and the second glass plate,
wherein a reflection layer and a $\lambda/2$ phase difference layer are included in at least a part of the interlayer,
the reflection layer includes a cholesteric liquid crystal layer having selective reflection in a visible light range,
the second glass plate, the $\lambda/2$ phase difference layer, the reflection layer, and the first glass plate are laminated in this order from visible side,
the $\lambda/2$ phase difference layer is disposed on an incidence ray side with respect to the reflection layer, and the incidence ray is p-polarized light which vibrates in a direction parallel to an incidence surface.

2. The projected image display system according to claim 1,
wherein a front phase difference of the $\lambda/2$ phase difference layer is in a range of 190 nm to 390 nm.

3. The projected image display system according to claim 1, wherein the reflection layer included in the member for displaying a projected image is only one.

4. The projected image display system according to claim 1,
wherein the reflection layer includes three or more cholesteric liquid crystal layers having selective reflection in a visible light range, and the three or more cholesteric liquid crystal layers have center wavelengths of the selective reflection which are different from each other.

5. The projected image display system according to claim 4,
wherein a cholesteric liquid crystal layer having a center wavelength of selective reflection in 490 nm to 570 nm, a cholesteric liquid crystal layer having a center wavelength of selective reflection in 580 nm to 680 nm, and a cholesteric liquid crystal layer having a center wavelength of selective reflection in 700 nm to 830 nm are provided.

6. The projected image display system according to claim 1,
wherein spiral senses of all of the cholesteric liquid crystal layers are identical to each other.

7. The projected image display system according to claim 1,
wherein a total thickness of layers of the reflection layer on the $\lambda/2$ phase difference layer side is greater than or equal to 0.5 mm.

8. The projected image display system according to claim 1,
wherein the interlayer is a resin film.

9. The projected image display system according to claim 8,
wherein the resin film contains polyvinyl butyral.

10. The projected image display system according to claim 1,
wherein a slow axis of the $\lambda/2$ phase difference layer with respect to a vertical upper side at the time of using the member for displaying a projected image is in a range of +40° to +65° or in a range of −40° to −65°.

11. The projected image display system according to claim 1,
wherein the spiral senses of all of the cholesteric liquid crystal layers included in the reflection layer are right, a slow axis of the λ/2 phase difference layer with respect to a vertical upper side at the time of using the member for displaying a projected image is in a range of 40° to 65° in a clockwise direction as seen from the λ/2 phase difference layer side with respect to the reflection layer; or
wherein the spiral senses of all of the cholesteric liquid crystal layers included in the reflection layer are left, and a slow axis of the λ/2 phase difference layer with respect to a vertical upper side at the time of using the member for displaying a projected image is in a range of 40° to 65° in a counterclockwise direction as seen from the λ/2 phase difference layer side with respect to the reflection layer.

12. The projected image display system according to claim 1,
wherein a half-width Δλ, of a selective reflection range of one or more cholesteric liquid crystal layers is less than or equal to 50 nm.

13. The projected image display system according to claim 1,
wherein the second glass plate, the λ/2 phase difference layer, the reflection layer, a second phase difference layer and the first glass plate are laminated in this order.

14. The projected image display system according to claim 13,
wherein a slow axis of the second phase difference layer with respect to the vertical upper side at the time of using the member for displaying a projected image is in a range of +10° to +35° or in a range of −10° to −35°, and
a phase difference of the second phase difference layer at a wavelength of 550 nm is 160 nm to 460 nm.

15. The projected image display system according to claim 13,
wherein a slow axis of the second phase difference layer with respect to the vertical upper side at the time of using the member for displaying a projected image is in a range of +100° to +140° or in a range of −100° to −140°, and
a phase difference of the second phase difference layer at a wavelength of 550 nm is 200 nm to 460 nm.

16. The projected image display system according to claim 1,
wherein the incidence ray is incident at an angle of 45° to 70° with respect to a normal line of the member for displaying a projected image.

17. The projected image display system according to claim 1,
wherein the incidence ray is incident from a lower side at the time of using the member for displaying a projected image.

18. The projected image display system according to claim 1,
wherein the projected image display system is a head up display system.

19. The projected image display system according to claim 13,
wherein the only phase difference layer included at the visible side of the reflection layer is the λ/2 phase difference layer.

20. A member for displaying a projected image, comprising:
a first glass plate;
a second glass plate; and
an interlayer between the first glass plate and the second glass plate,
wherein a reflection layer and a λ/2 phase difference layer are included in at least a part of the interlayer,
the reflection layer includes a cholesteric liquid crystal layer having selective reflection in a visible light range, and
the second glass plate, the λ/2 phase difference layer, the reflection layer, a second phase difference layer and the first glass plate are laminated in this order from visible side.

* * * * *